(12) United States Patent
Cartaya et al.

(10) Patent No.: US 10,298,448 B2
(45) Date of Patent: May 21, 2019

(54) METHOD AND APPARATUS FOR EXTENDING SERVICE CAPABILITIES IN A COMMUNICATION NETWORK

(71) Applicant: AT&T INTELLECTUAL PROPERTY I, L.P., Atlanta, GA (US)

(72) Inventors: Julio Cartaya, Tinton Falls, NJ (US); Robert M. Higgins, Manasquan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 242 days.

(21) Appl. No.: 15/270,091

(22) Filed: Sep. 20, 2016

(65) Prior Publication Data

US 2018/0083828 A1    Mar. 22, 2018

(51) Int. Cl.
*H04L 12/24* (2006.01)
(52) U.S. Cl.
CPC .......... *H04L 41/0803* (2013.01); *H04L 41/12* (2013.01)
(58) Field of Classification Search
None
See application file for complete search history.

(56) References Cited

U.S. PATENT DOCUMENTS 6,466,971 B1 * 10/2002 Humpleman ....... H04L 12/2803
709/203
8,666,403 B2   3/2014 Yu et al.
(Continued)

FOREIGN PATENT DOCUMENTS

EP   2695409 A1   2/2014
EP   3032849      6/2016
(Continued)

OTHER PUBLICATIONS

Ashraf, Qazi , "Broadcast Based Registration Technique for Heterogeneous Nodes in the IoT", http://www.academia.edu/download/42727197/Broadcast_Based_Registrafion_Technique_f20160216-9318-1ddp0q9.pdf, Discloses registering different types of devices in a group with adequate protection (pp. 46-48)., 2014.

(Continued)

*Primary Examiner* — Younes Naji
(74) *Attorney, Agent, or Firm* — Guntin & Gust, PLC; Douglas Schnabel

(57) ABSTRACT

Aspects of the subject disclosure may include, for example, a method including selecting a solution set of devices from a set of candidate devices connected to a network to provide a service via a virtual device, generating a virtual finite state machine to control execution of the required functions of the virtual device via selected capabilities of each device of the solution set of devices transmitting, to a controller device of the solution set of devices, the virtual finite state machine, wherein execution of the virtual finite state machine by the controller device causes the controller device to control the required functions of the virtual device via the selected capabilities of each device of the solution set of devices, and transmitting, to non-controller devices of the solution set of devices, software data and configuration data, wherein execution of the software data at the non-controller devices according to the configuration data causes the non-controller devices to perform the selected capabilities according to signals sent by the controller device.

20 Claims, 14 Drawing Sheets

(56) References Cited

U.S. PATENT DOCUMENTS

| | | | |
|---|---|---|---|
| 8,818,946 | B2 | 8/2014 | Foti et al. |
| 8,942,191 | B2 | 1/2015 | Kushwaha et al. |
| 8,989,091 | B2 | 3/2015 | Hedman et al. |
| 9,037,176 | B2 | 5/2015 | Kim et al. |
| 9,037,730 | B2 | 5/2015 | Sanchez |
| 9,131,480 | B2 | 9/2015 | Huang et al. |
| 9,292,832 | B2 | 3/2016 | Goel et al. |
| 2011/0213871 | A1 | 9/2011 | DiGirolamo et al. |
| 2012/0066396 | A1 | 3/2012 | Kang et al. |
| 2012/0106431 | A1 | 5/2012 | Wu et al. |
| 2012/0287469 | A1* | 11/2012 | Tomiyasu .......... H04N 1/00244 358/1.15 |
| 2012/0296968 | A1 | 11/2012 | Lin et al. |
| 2013/0029716 | A1 | 1/2013 | Lee et al. |
| 2013/0227036 | A1 | 8/2013 | Kang et al. |
| 2013/0265932 | A1 | 10/2013 | Huang et al. |
| 2013/0339438 | A1 | 12/2013 | Cherian et al. |
| 2014/0120907 | A1 | 5/2014 | Yu et al. |
| 2014/0241354 | A1 | 8/2014 | Shuman et al. |
| 2014/0324973 | A1 | 10/2014 | Goel et al. |
| 2014/0351443 | A1* | 11/2014 | Tang .................. G06F 9/45533 709/226 |
| 2015/0023244 | A1 | 1/2015 | Shaheen et al. |
| 2016/0055573 | A1 | 2/2016 | Chen |
| 2016/0174218 | A1* | 6/2016 | Stanescu .......... H04W 72/1215 370/336 |
| 2016/0205097 | A1 | 7/2016 | Yacoub |
| 2017/0013021 | A1* | 1/2017 | Hoy ...................... H04L 63/205 |
| 2018/0059898 | A1* | 3/2018 | Miller .................... H04L 67/38 |

FOREIGN PATENT DOCUMENTS

| | | |
|---|---|---|
| WO | 2013120225 A1 | 8/2013 |
| WO | 2015042370 A1 | 3/2015 |
| WO | 2015122820 | 8/2015 |

OTHER PUBLICATIONS

Dohr, Angelika, "The Internet of Things for Ambient Assisted Living", https://pdfs.semanticscholar.org/9dcd/048e91948a15a9ab6cd80213e96c634a0815.pdf, Disclosing IoT group including registered remote devices (Figure 2, from the 2nd to 4th Pages illustrating with health services)., 2010.

Miranda, Javier, "From the Internet of Things to the Internet of People", https://www.researchgate.net/profile/Juan_Murillo2/publication/273792989_From_the_Internet_of_Things_to_the_Internet_of_People/links/56af268308aeaa696f2fc2d2.pdf, Disclosing the development of combining interactions between devices led to M2M communications, thence to the IoT (pp. 3-4)., 2015.

Rodríguez-Molina, Jesús, "Combining Wireless Sensor Networks and Semantic Middleware for an Internet of Things-Based Sportsman/Woman Monitoring Application", http://www.mdpi.com/1424-8220/13/2/1787/pdf, Disclosing devices registering with a group agent (Sections 3.2.2-3.2.5 on pp. 1802-1807; Figures 4-7)., 2013.

Xu, Chen, "Efficiency Resource Allocation for Device-to-Device Underlay Communication Systems: A Reverse Iterative Combinatorial Auction Based Approach", http://arxiv.org/pdf/1211.2065, Disclosing evolution of peer-to-peer networks to D2D with Dutch auction establishing communication parameters for a group around the least resource-intensive of those qualified devices (Figure 1; Abstract; pp. 3-4 and 21)., 2013.

* cited by examiner

500

Initial Graph    Edge-Reversed Graph

500

Parallel Execution

500

Serial Execution

500

800

METHOD AND APPARATUS FOR EXTENDING SERVICE CAPABILITIES IN A COMMUNICATION NETWORK

FIELD OF THE DISCLOSURE

The subject disclosure relates to a method and apparatus for extending service capabilities in communication networks.

BACKGROUND

There is an expanding ecosystem of devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, we should expect connection models to expand, flow into one another and greater cooperative interaction between devices to emerge. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

Figure 1A:
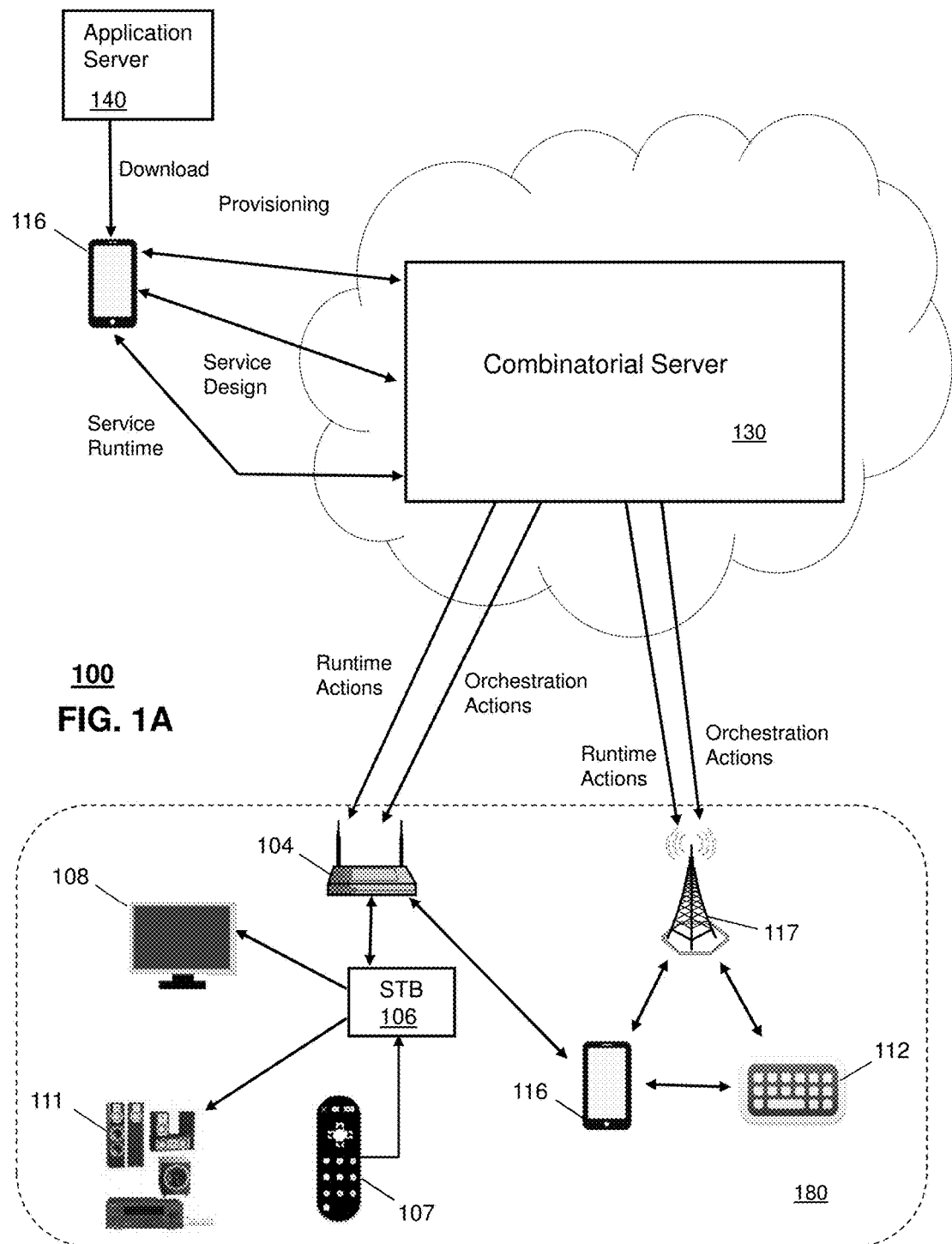
FIGS. 1A-1B depicts illustrative embodiments of an exemplary system that can be utilized for extending service capabilities of communication devices via synthesis of virtual devices for performing a combinatorial service via combinations of device capabilities.

The subject disclosure describes, among other things, illustrative embodiments for providing combinatorial services via a communication network. A communication device can request a service that is beyond its capabilities. A combinatorial server, or servers, can identify capabilities of devices connected to the network. A solution set of devices can be selected by comparing the capabilities of each device of the set of candidate devices with a set of required functions of the virtual device capable to provide the service. The combinatorial server can assign capabilities of the selected devices to perform the required functions of the virtual device, and can generate a virtual finite state machine to implement the required functions of the virtual device using the selected capabilities of the devices of the solution set of devices. The combinatorial server can transmit the virtual finite state machine to a controller device of the solution set of devices, so the controller device can perform high-level control of the virtual device. The orchestration server can also transmit software data and configuration data to non-controller devices of the solution set of devices, so the non-controller devices can perform the selected capabilities as instructed by the controller device. Other embodiments are described in the subject disclosure.

One or more aspects of the subject disclosure include a machine-readable storage medium, including executable instructions that, when executed by a processing system including a processor, facilitate performance of operations, including detecting a plurality of devices connected to a network to identify a set of candidate devices, and, in turn, determining capabilities for each device of the set of candidate devices connected to the network. The operations can also include selecting a solution set of devices from the set of candidate devices to provide a service via a virtual device by comparing the capabilities of each device of the set of candidate devices with a set of required functions of the virtual device capable to provide the service. The operations can also include assigning selected capabilities of each device in the solution set of devices to perform the required functions of the virtual device. The operations can further include generating a virtual finite state machine for controlling the required functions of the virtual device via the selected capabilities of each device of the solution set of devices. The operations can include transmitting, to a controller device of the solution set of devices, the virtual finite state machine. Execution of the virtual finite state machine by the controller device causes the controller device to control the performance of the required functions of the virtual device via the selected capabilities of each device of the solution set of devices. The operations can include transmitting, to non-controller devices of the solution set of devices, software data and configuration data. Execution of the software data at the non-controller devices according to the configuration data causes the non-controller devices to perform the selected capabilities according to signals from the controller device.

One or more aspects of the subject disclosure include a server, comprising a processing system including a processor and a memory that stores executable instructions that, when executed by the processing system, facilitate performance of operations, including determining capabilities for each device of a set of candidate devices connected to a network. The operations can include selecting a solution set of devices from the set of candidate devices to provide a service via a virtual device by comparing the capabilities of each device of the set of candidate devices with a set of required functions of the virtual device capable to provide the service. The operations can further include generating a virtual finite state machine for controlling the execution of the required functions of the virtual device via selected capabilities of each device of the solution set of devices. The operations can include transmitting, to a controller device of the solution set of devices, the virtual finite state machine. Execution of the virtual finite state machine by the controller device causes the controller device to control the required functions of the virtual device via the selected capabilities of each device of the solution set of devices. The operations can include transmitting, to non-controller devices of the solution set of devices, software data and configuration data. Execution of the software data at the non-controller devices according to the configuration data causes the non-controller devices to perform the selected capabilities according to signals sent by the controller device.

One or more aspects of the subject disclosure include a method including selecting, by a processing system comprising a processor, a solution set of devices from a set of candidate devices connected to a network to provide a service via a virtual device. The selecting can based on comparing capabilities of each device of the set of candidate devices with a set of required functions of the virtual device capable to provide the service. The method can also include generating, by the processing system, a virtual finite state machine for controlling execution of the required functions of the virtual device via selected capabilities of each device of the solution set of devices. The method can further include transmitting, by the processing system, to a controller device of the solution set of devices, the virtual finite state machine. Execution of the virtual finite state machine by the controller device causes the controller device to control the execution of the required functions of the virtual device via the selected capabilities of each device of the solution set of devices. The method can include transmitting, by the processing system, to non-controller devices of the solution set of devices, software data and configuration data. Execution of the software data at the non-controller devices according to the configuration data causes the non-controller devices to perform the selected capabilities according to signals from the controller device.

Figure 1B:
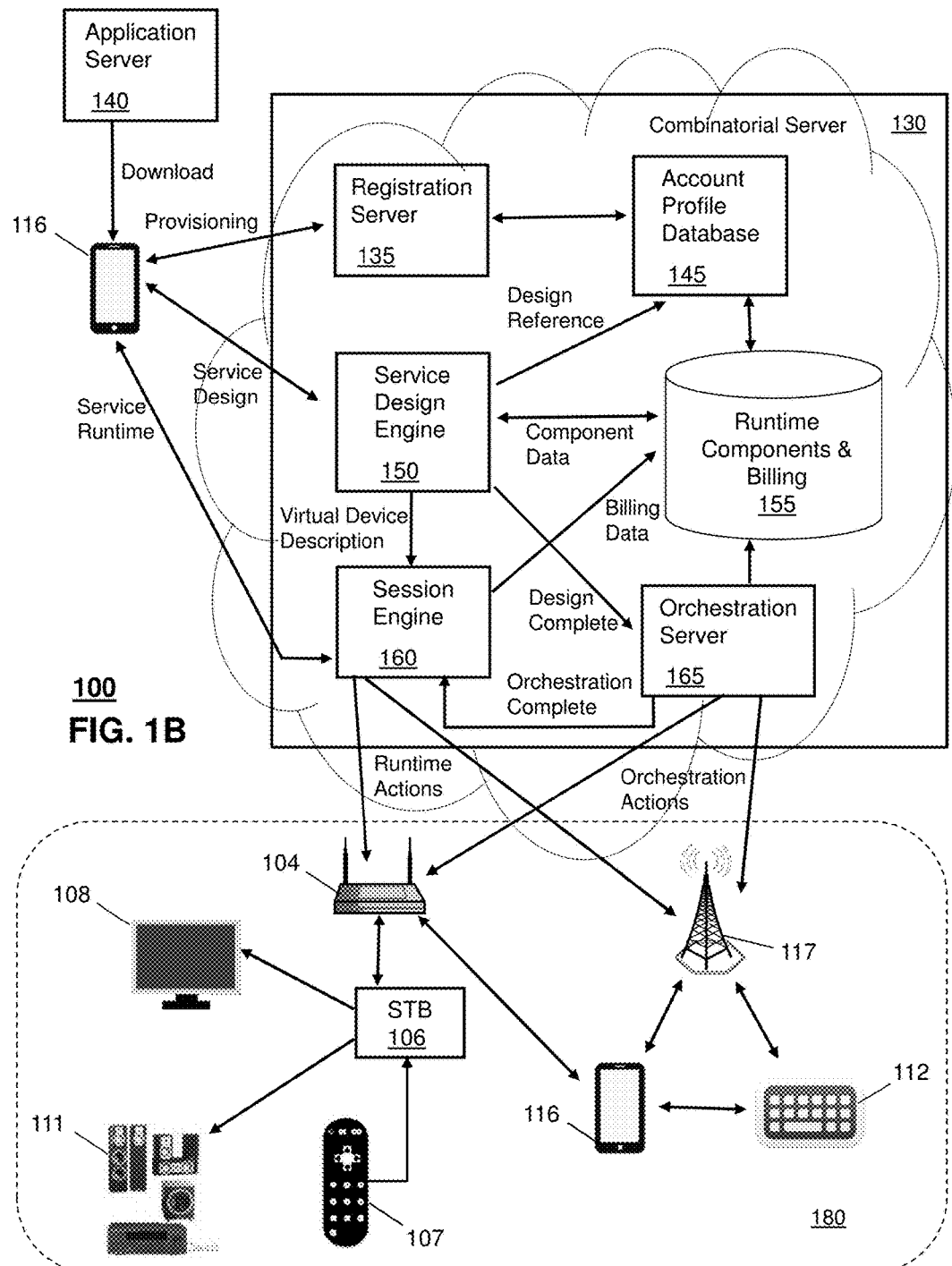

FIGS. 1A-1B illustrative exemplary embodiments of a system that can be utilized for extending service capabilities of communication devices via synthesis of virtual devices for performing a combinatorial service via combinations of device capabilities. In one or more embodiments, a Combinatorial Server 130, operating at a network 100, can create sets of virtualized resources that combine resources available to a user of the network to create services and capabilities that extent well beyond those available resources. The Combinatorial Server 130 can select a set of devices to perform a requested service and then generate rules to control behaviors of this set of devices to meet requirements of this service. The Combinatorial Server 130 uses network connectivity to orchestrate the creation of a virtual device by pulling together individual devices and capabilities. FIG. 1A illustrates a Combinatorial Server 130 as a "black box" function for performing this orchestration to generate a virtual device and to provide finite state machines (FSMs) that are instantiated within component devices of the virtual device for controlling those component devices during operation of the virtual device. FIG. 1B illustrates an example or exemplary embodiment of one architecture for performing functions that can be included in a Combinatorial Server 130. The Combinatorial Server 130 can include any portion of the functional blocks illustrated in FIG. 1B.

In one or more embodiments, and by way of providing exemplary context for devices and resources that may be combined to form virtual devices using the combinatorial server 130, several aspects and/or features of an exemplary system 100 can be described. In one embodiment, content can be routed to an IPTV network, which, in turn can deliver content to a gateway device 104. In turn, the gateway device 104 can route content to a media processor device 106, such as a set-top box. In another embodiment, a content server can deliver content by an IMS network to a mobility network 117. The mobility network 117 can route content to a mobile communication device 116, such as a wireless smart phone, via a cellular, long term evolution (LTE), third generation (3G), and/or fourth generation (4G) wireless networks. In one embodiment, the mobile communication device 116 can route content that is received over the mobility network 117 by, for example, a mobile hotspot Wi-Fi link between the mobile communication device 116 and a keyboard device 112 or a media device 108. In another embodiment, a content server can deliver content over a public IP network, which, in turn, can deliver content through a gateway device 104 to a mobile communication device 116 and/or wireless communication devices 116. Devices 116 that receive media content from an IP network can, in turn, transmit the media content to a media device 108 via direct connection, such as a USB port, or via a wireless connection, such as Wi-Fi. In another embodiment, a content server can route content via a virtual private network (VPN) 170.

In one or more embodiments, the system 100 can further include authentication functions to insure that media content is distributed only to verified subscribers of the system 100, and/or media content sources according to service plan levels of those subscribers. For example, the system 100 can verify that media processor device 106 is be properly identified and validated for receiving media content over the system 100. For example, one or more authentication servers can be used to verify the subscription status of the media processor device 106. Device identifying information, such as MAC address, IP address, and/or SIM card information, can be transmitted to an authentication server. An authentication server can use this identifying information from the media processor device 106 to inquire at a subscriber database of service plan information for a subscriber who is associated with the device 106. The subscriber database can provide subscription status and service plan information to allow the authentication server to enable delivery of purchased media content to the media processor device 106. In one or more embodiments, the media content can be selected based on a number of techniques and criteria, such as based on user input, user preferences, user profiles, monitored user viewing history, and so forth.

In one embodiment, a gateway device 104 can function as an interface between an IPTV network and the media processor device 106. In one embodiment, the gateway device 104 can provide internet working functions, such as protocol translation, impedance matching, data rate conversion, and/or fault isolation necessary for exchanging data between the IPTV network and the home-based media processor device 106. In one embodiment, a gateway device 104 can provide access to a public IP network via the system 100. The public IP network can facilitate communications to Internet-based applications, websites, and databases, such as Social Media sites and Web Databases. This connectivity can allow devices 116 in the system 100 to access and be accessed by the various Internet-based applications, websites, and/or databases.

In one or more embodiments, a device 116, such as a mobile communication device 116, can receive content through various network pathways. For example, the device 116 can receive content via wireless communication with a cellular base station 117 of a mobility network. The device 116 can also receive content via wireless communication with gateway device 104 coupled to an IPTV network or coupled to an IP network. The device can also receive content via wireless connection with a keyboard device 112, wireless connection with media device 108, or wireless connection with media processor device 106. At any given moment, the mobile communication device 116 can receive wireless communication signals from many cellular sources, local area network sources (e.g., WiFi networks), and/or short range sources (e.g., Bluetooth™).

Target Architecture

In one or more embodiments and as illustrated in FIG. 1B, the system 100 can include a target architecture for providing Combinatorial Services to one or more devices 116, 106, 108 111, and 112 by combining functional capabilities of these devices to create services. In one embodiment, the target architecture can be a cloud-based serving system, such as a combinatorial server 130. The combinatorial server 130 can be organized in various ways and can include one or more of functional blocks, depending upon particular features of the network. For clarity of illustration, the illustrated combinatorial server 130 can include some but not necessarily all of the logical or physical relations that can make up the combinatorial server 130.

Application Server

In one embodiment, a device, such as a mobile communication device 116, can download a combinatorial application from an application server 140. The application can provide the mobile communication device 116 with a client application for interfacing with services of the combinatorial server 130. For example, the client application can allow the device 116 to be registered with the combinatorial server 130, associated with a particular user and location, and/or associated with one or more additional devices that can serve as a set of candidate devices for synthesis of services via combination. In one embodiment, the client application can provide an interface for a user to make a service inquiry or request to the combinatorial server 130 and to receive requests from the combinatorial server 130 for additional information and/or acceptance or denial of the request. For example, the mobile communication device 116 can request a service for assembling a personal computer (PC) function from separate devices available to the user (and accessible to the network). The combinatorial server 130 can respond to this request by requesting additional information to clarify the request, to draw out and/or limit specific functional requirements, to determine preferences for which of the available or candidate device to include, exclude, assign to specific tasks, remind the user to turn on, and so forth. The client application can also provide a list of previously constructed service combinations. For example, the combinatorial server 130 can construct a set of services from device combinations that are anticipated to be popular and/or are made up of devices that are likely to be commonly available. The combinatorial server 130 can also provide options for selecting services that the user has previously selected or that are recommended based on previous sessions or based on information regarding a new device (and, therefore new device capabilities) that has been acquired by the user.

In one or more embodiments, the client application can facilitate identification and authentication of the user. The combinatorial service can be marketed to the user as a premium service for which a subscription is required. The client application can provide subscription information to the combinatorial server 130 to enable to service as well as collect appropriate user authentication information from the user (i.e., user name and password) to insure that the only authenticated users are accessing the services. Likewise, the authentication can insure that accesses to user devices, including download of software and configuration data the temporary takeover of control of these devices for use in creating services, are performed with proper permission. In one or more embodiments, the client application can provide user interface for beginning and ending service sessions and collecting payment for services, if needed.

Registration Server

In one embodiment, the combinatorial server 130 can include a registration server 135. The registration server 135 can coordinate identification of component devices (e.g., laptops, tablets, keyboards 112, smartphones 106, set top boxes 104, audio systems 111, game consoles, etc.) that are present in the system 100. The registration server 135 can receive information regarding a set of candidate devices for use in synthesizing services from one or more sources. For example, a user can provide a list of devices to a client application. In one embodiment, the registration server 135 can access subscription information associated with the user and/or a device 106 or 116.

Account Profile Database

In one or more embodiments, pre-registration of devices can be performed by the registration server 135 by use of an account profile database 145. The account profile database 145 can validates ownership of component devices eligible for combinatorial services. For example, the registration server 135 can receive information from a home subscription server (HSS) regarding devices, subscriptions, and/or profiles of the user that can include lists of devices, capabilities, and/or other descriptions that can useful in identifying candidate devices. In one or more embodiments, devices that are associated with the user can be registered to the combinatorial server 130 prior to a request for a service and/or registration can be initiated after a service request is received. The account profile database 145 can also drive billing of services and/or save personal choices in the context of components, roles, assignments, and so forth, for later reuse.

Registration Server

In one or more embodiments, the registration sever 135 and account profile database can provide a list of candidate devices from which the combinatorial server 130 can select. In one embodiment, these candidate devices must be capable of, and compatible with, remote control by the combinatorial server 130. For example, to control a device, such as a remote controller 107, the combinatorial server 130 can load a control software, in form or a hypervisor, onto the remote controller 107 and can load configuration data onto the remote controller 107 for initiation to a preferred state. In this scenario, the remote controller 107 must be able to receive and process these software and configuration inputs and must further be able to send and receive messages with the combinatorial server 130 via the network and perform operations based on those messages. In addition, the registration sever 135 and account provide database 145 can be responsible for determining hypervisor availability for specific devices and combinations of hardware and software (firmware), as well as capability virtual machine (CVM) capabilities working those hypervisors.

Runtime Components & Billing Database

In one or more embodiments, the combinatorial server 130 can include a runtime components & billing database 155, which can maintain per-session usage and other billing parameters. The runtime components & billing database 155 can track which devices are selected and used by the combinatorial and/or which network services are used in generating the request service. The runtime components & billing database 155 can determine usage of resources, such as data available in a data plan, on-demand content, subscription-based data, premium services, and so forth. The runtime components & billing database 155 can track billing information for these services as applied to the user and/or to particular devices that are used in the synthesized services. In one embodiment, the runtime components & billing database 155 can provide information to a service design engine 150 regarding availability of subscription resources so that the service design engine 150 can consider subscription plan limits and/or costs when determining which devices to select for services and how to assign the capabilities of these devices to various functions required by the service.

Server Design Engine

In one or more embodiments, a service design engine 150 can interact with the user, through the client application operating at a user device 116, to present service choices and guide the user through selection of participant devices. The service design engine 150 can also display terms and/or conditions (including price of service) and can confirm user acceptance of the proposed service to trigger orchestration. In one or more embodiments, the service design engine 150 can determine, from a set of candidate devices, one or more solution sets of devices that can provide a chosen service by collaborative effort as coordinated by the combinatorial server 130. The service design engine 150 can determine the solutions sets of devices by comparing the available capabilities of the selected devices with a set of required functions that a virtual device would need in order to provide the service. If more than one solution set of the available devices can provide the service, then the service design engine 150 can further select a best set solution set of devices based on selection criteria, such as reducing cost of service or impact on other services. The service design engine 150 can also determine assignments of the capabilities of the selected devices to the required functions based on assignment criteria. The service design engine 150 can generate control procedures, such as finite state machines (FSMs), which can coordinate the collaborative efforts of the selected devices to generate the service. The service design engine 150 can provide one or more control procedures to an orchestration server 165.

Orchestration Server

In one or more embodiments, the combinatorial server 130 can include an orchestration server 165. The orchestration server 165 can selects procedures from databases of past sessions and/or default services. The orchestration server 165 can load and executes orchestration procedures and trigger session initiation. The orchestration server 165 can also receive session termination events and trigger de-orchestration of the virtual device by releasing the selected devices from participation in performing the service.

Session Engine

In one or more embodiments, the combinatorial server 130 can include a session engine 160. The session engine 160 can collect virtual device performance data and perform monitoring of service performance. The session engine 160 can also handles in-session changes of component devices and/or component assignments or roles. The session engine 160 can signal the orchestration engine 165 when the virtual device of the service can be de-orchestrated and sends session data to the runtime components and/or to the runtime components & billing database 155.

Generating Virtual Devices

In one or more embodiments, services can be offered to a user that go beyond the limitations of each of the devices that are registered to the user. These extended services can be provided by temporarily aggregating (combining) the capabilities of those devices to create a "virtual device" that can do the job. Once the service is no longer needed, the temporary combination can be undone, and the component devices can be returned to their normal operation. The nature of the capabilities combined can be quite general. For example, the virtual device service can be synthesized from device capabilities for data storage, currently extant device contents, processing/computing resources, high-speed network/streaming capability, high resolutions display, high fidelity audio, and so forth. In one or more embodiments, limitations of particular devices in the combination can be overcome and/or circumvented using appropriate software, device-device connectivity, and orchestration. These limitations are often a consequence of device-specific requirements for portability, cost containment, and so on, that are imposed to make these individual devices via in the marketplace. However, the combinatorial server 130 can pick and choose devices and device capabilities so as to use the best available resources that are within the realm of the user.

In one or more embodiments, the virtual devices can be created by aggregating capabilities that improve customer focus and customer benefits. In one embodiment, pre-canned combinations can be offered to users and implemented upon user acceptance. In further embodiments, capability combinations can be generated dynamically, based on current user preferences and conditions and on ever-changing device availability and network capability. As such, a "personal cloud" of virtual devices (and resulting services) can be constructed and maintained to meet the needs of each user. As the network evolves to acquire near-real-time intelligent capabilities, the combination server 130 can continually improve its ability to adapt new devices and network capabilities to generate new services. In addition to individual users (customers), the dynamic nature of the combinatorial server 130 can be used to manage the capabilities of devices available to a group of customers. Certain services, such as multi-player games, collaboration tools, and/or flash-mob services, can be developed and tailored based on combining not only the devices of a single user but also combining devices of multiple users to generate collaborative services for multiple users.

Exemplary Virtual Devices

Many types of services and combinations of devices can be created by the combinatorial server 130. For example, the combinatorial server 130 can be used to assemble a personal computer (PC) functionality from separate home components. A media processor device 106, such as a processor for receiving satellite television signals and decoding these signals for display at a media device 108, can be capable of feeding an HDMI signal to a TV set (video, audio). By comparison, these capabilities are normally beyond those of a smartphone 116. The combinatorial server 130 can determine that a user has access to a smartphone 116, a wireless capable television 108, a remote controller device 112, and a keyboard device 112 that are, in turn, accessible, either directly or indirectly, to combinatorial server 130 via the network. The combinatorial device 130 can posit a virtual device capable of at least a subset of PC functionality, such as web browsing, reading and/or editing documents, looking at detailed images, enjoying quality music, etc. The combinatorial server 130 can compare a set of functional requirements for this type of PC device against a set of capabilities available on the smartphone 116, media device 108, remote controller device 107, and keyboard 112. The combinatorial server 130 provide control software and, if necessary, configuration data to the set of devices and control these devices via the orchestration server 165. The orchestration server 165 can use the keyboard 112 as a keyboard, the remote controller 107 as a mouse, the media device 108 as a display, and the smartphone as a computing and network access device to synthesize a type of PC device.

In one or more embodiments, the combinatorial server 130 can synthesize other useful, virtual devices from combinations of available candidate devices. For example, a set top box 106 (e.g., a DirecTV™ receiver), one or more smartphones 116, and a media device 108 can be combined to execute and display a video game. Other smartphones 116 can be added as input devices for other players to play the game. In another example, the combinatorial server 130 can synthesize a two-way video conferencing system by orchestrating contributions from a media processor device 106, a media device 108, a sound system 111, and a smartphone device 116. The smartphone 116 could contribute camera and microphone, while the media processor device 106 could supply video and audio feeds to a large-screen, HDMI capable media device 108. In another example, an aid for a disabled user can be synthesized from a media processor device 106 and a smartphone device 116. The media processor device 106 can present an enlarged phone input/output interface to ease the use of the smartphone 116 by people who have limited eyesight and/or capacity to steady their hands and make accurate touches on the smartphone screen. Further examples of collaborative services that can be synthesized by a combinatorial server 130 can include a medical monitoring device combining personal monitoring and/or therapy devices (e.g., a heartbeat monitor) with medical equipment devices (e.g., as found in a medical office), where data can be transferred from the personal monitors to the medical equipment and/or the personal monitors can be calibrated according to the medical equipment.

In another example, a universal remote controlling device can be synthesized from various kinds of devices, such as media devices 108 (displays), computer devices (PCs), smartphones 116. These universal remote controllers can control applications for display on large screen devices 108, playback music on home stereo units 111, 2-way video conferences, multi-player games, and so forth. In another example, medical or hospital equipment can be combined via the combinatorial server 130 to synthesized virtual equipment services in operating rooms, patient rooms, and/or laboratories. Further examples of combinatorial services include virtual devices synthesized for controls for drones and complex robotic tools/weapons, remote vision, human carried equipment, Internet of Things (IoT) device controllers, integration and control of remote sensors and actuator devices for law enforcement applications, multi-site conferencing for offices, schools, and academia, multi-display, virtual devices for training activities, remote control of office, laboratory, and/or industrial devices, product advertising/demonstrations, extending/adding capabilities to smartphones, vehicles, and homes. Further application of the combinatorial concepts can create custom devices for capturing three dimensional images (e.g., by combining two or more smartphones 116), creating a synthetic seismograph from accelerometers included in smartphones 116, measuring traffic flow, detecting traffic jams by determining timing of smartphone 116 handovers between cell towers, and/or creating a "multi-points of view" experience of an event (e.g., a crowd gathering) by combining audio/video captured from multiple users.

Required Capabilities of the Virtual Device

At any moment, network users are surrounded by various devices that may be accessible, directly or indirectly, to the network and that are in some way associated sufficiently with the user so as to provide a modicum of user permission for their use in providing a service to the user. These devices may be laptops, smartphones 116, media processor devices 106 or receivers, car infotainment systems, smart objects, and/or IoT devices. Each of these available devices has a set of capabilities. These device capabilities can be inherent to the device's design. Alternatively, the device capabilities can be amenable to configuration. A database and/or table can be compiled that lists, for example, each device, d, and the capabilities of each of these devices, c(d). For example, a media processor device 106 for reception of satellite television can have capabilities for receiving digital satellite signals, accessing contents from content management servers via the network, saving multimedia to a large-capacity hard drive, displaying large high resolution images through a big-screen TV 108, and/or playing high fidelity sound through a connected stereo 111. At the same time, a mobile phone device 116 may have multimedia content that a user would like to play, and/or a directory entry to reach someone via a telephone call or text message.

In one or more embodiments, in order to provide any combinatorial service, S, to a device, a set of capabilities are required for the virtual device. The set of capabilities can be expressed as $\{s_1, \ldots s_n\}$. Traditionally, a service cannot be implemented unless all the capabilities exist in a single device. Users attempt to circumvent these device limitations by transporting signals with patch cables (stereo), copying media files from device x to device y (sometimes involving intermediate media), and so forth. While device services can be extended in these ways, users face practical limits due to physical constraints. For example, input/output ports must exist and must match available connection means, patch cables must have the right connectors and be long enough, must have the right signal encodings/levels for the expected applications.

If a more complex service, S, is needed, either in a permanent, recurring, and/or and frequent application, then the marketplace may offer a range of options for purchasing and/or leasing with a complex device or set of devices that are capable of performing the specific service. For occasional uses, these offers may be inconvenient and/or expensive options with limited applicability to other uses. As a general matter, the term 'capabilities' can be understood as relatively high-level functions that are familiar to most customers. For example, capabilities can include display, storage, playback, and so forth.

In one or more embodiments, where a desire for a service is relatively temporary, the range of commercial services can be expanded by synthesizing a virtual device out of a number of resources and to offer this synthesized service to the end user. For any service, S, with a given set of required capabilities, a combination of devices may—in principle—implement S, as long as the aggregate of capabilities contains $\{s_1, \ldots s_n\}$. The synthesized service, S, can be implemented by a series of processes. First, the service, S, can be designed by determining the set of capabilities required $\{s_1, \ldots s_n\}$, determining the devices that available for use in the collaborative effort, verifying the feasibility of each of the available devices and of a solution set of devices that is selected to achieve the service, and assigning particular capabilities of particular devices to particular required capabilities of the virtual device.

In one or more embodiments, virtual devices can be generated using a process. For any service S with a given set of required capabilities, a combination of devices may—in principle—implement S, as long as the aggregate of capabilities contains $\{s1, \ldots sn\}$. In pursuit of the same example we may replace patch cables by software processes and connectivity, but it must be done in a consumer-friendly way. To implement a service S, we need processes to perform:

Design: Knowing the set of capabilities required $\{s1, \ldots sn\}$ and the devices available for design, verify feasibility, and assign components to make up the virtual device. This process can be decomposed as follows:
Detection: List devices available and their capabilities
Elimination: Verify capabilities in devices, report to user (i.e. feasible, conditionally feasible, or unfeasible), and request user intervention if additional devices are needed to contribute capabilities to the virtual device
Selection: Make a transient aggregate and manage capabilities to avoid overcommitting a device
Assignment: Decide which components will contribute which capabilities to the virtual device if they overlap
Orchestration: Run processes capable of assembling the virtual device based on chosen components
Control: Implementing, in the context of Combinatorial Services for Component Device Operation and Virtual Device Operation
Release: Return devices to their normal (independent) operation after the service complete Detecting Available Devices In one or more embodiments, the goal of the detection process is to list devices that are available for use in the collaboration and to catalog or list the relevant capabilities of each of these devices. In one embodiment, the available devices can be detected by tracking information associated with device registrations. For example, when a mobile phone 116 is turned ON (or leaves a long-term IDLE state), a registration of the device 116 can be triggered. This registration can generate a record of a unique network address and other items that can define the device's functional capabilities, the network location, and which user it is belongs to. In this case, devices are effectively preregistered with the registration server 135 before they are needed in forming a combinatorial service. The registration server 135 can know a unique physical address (MAC) for an available device and can know that the device belongs to subscriber X. If subscriber X requests a service requiring collaboration, the service design engine can be informed that a device belonging to subscriber X is available on the network. The capabilities of this device can be retrieved from storage in the account profile database 145. Alternatively, the combinatorial server 130 can cause the device to report or expose its capabilities by contacting the device when this information is needed during synthesis of the service. The device that is registered to the network and can subsequently be assigned to a virtual device service by a selection process.

In one or more embodiments, the available devices can be determined using a device discovery protocol that can (typically) propagate only within a local area network (LAN). For example, a multicast Domain Name System (mDNS) protocol or a Discovery and Launch (DIAL) protocol can be used to search for available devices on a Wi-Fi network. In one embodiment, devices can broadcast low-energy/low-range/inconspicuous signals (e.g., radio, audio, etc.) that can be received by other devices. Reception of these signals can be used to detect the presence of these devices and, in some cases, identification information. In one embodiment, devices may be added to a detection list by a services provider. For example, a user may temporarily lease a device, or a service provider (or a third party) may make a device, such as a device with a rare or unique capability, available over the network. Identification and capability information for these devices can be directly available to the registration server 135 and/or account profile database 145.

Eliminating Devices

In one or more embodiments, certain devices in the list of available devices may be eliminate from use potential selection by the combinatorial server 130 under certain conditions. Capabilities that are listed or reported for each device can be verified, and the verification results reported to the service design engine 150 and/or the user (i.e. feasible, conditionally feasible, or unfeasible). A user intervention may be requests for capabilities that are rendered unfeasible due the device being turn off or being disconnected from the network.

In one or more embodiments, devices in the list of available device can be required to satisfy constraints based on the nature of a virtual service that is being designed and/or due to restrictions imposed by the end user. An available device can be rejected for use in the virtual service if it fails to satisfy all of the constraints that have been placed on the device. If, on the other hand, the device satisfies all of the constraints, then the device can be considered a "candidate device" or a member of a set of candidate devices. In one or more embodiments, constraints implicit in the service can include performance, security, bandwidth, and capacity of device, either viewed as standing alone or viewed in the context of the network. The purpose of the constraints is to guarantee the quality of the resulting combinatorial service. For example, the service, as a whole, may have to comply with regulations for security. If an available device fails to meet a security requirement, then this device can be eliminated so that it does not become a "weak link" in the chain of security for the final, virtual device.

In one or more embodiments, an end user may impose custom constraints on devices that are eligible to participate in the virtual device. For example, a user may specify that devices must meet certain parameters for ownership, cost, privacy, current workload, convenience, and so on. In this case, the combinatorial server 130 can provide the end user with choices and explain the consequences of these choices using, for example, the client application. For example, the client application can present a current list of candidate devices and can modify this list as the user modifies the constraints (e.g., relaxing/removing constraints, or adding/making restraints more strict).

Candidate Device Selection

In one or more embodiments, the service design engine 150 of the combinatorial server 130 can select a solution set of devices from the set of candidate devices, where this solution set of devices can be capable of performing the desired service when their efforts are properly orchestrated by the orchestration server 165. In one embodiment, a Device-Capabilities matrix can be defined to bring the capability information associated with the set of candidate devices together with the capability requirement information associated with the virtual device of the desired service. The matrix can be an M×N matrix with candidate devices in the M-rows, and capabilities in the N-columns. In one approach, an element E[p, q] of the M×N matrix can be given the value 1 if device p has capability q. If device p does not have capability q, then the element E[p, q] can be given the value 0. In this construct, the target virtual device has exactly the capabilities needed for the desired service. A (M+1)×N matrix (a Selection matrix) can be added to the Device-Capabilities matrix as a row M+1 to describe the target virtual device.

Using this approach for each 1 that is present in a row of a candidate device M×N matrix, a corresponding 1 can be removed from the virtual device row of the (M+1)×N selection matrix by the service design engine 150 to indicate that this particular required capability has been covered by this candidate device. This process is repeated for each device in the set of candidate devices until all of the required capabilities have been filled—as indicated by all of the rows in the virtual device (M+1)×N selection matrix being cleared to 0. If there are no is left in the virtual device row of the (M+1)×N selection matrix, then the service design engine 150 can exit the selection process and conclude that the devices chosen so far constitute a solution set that is capable of producing the desired service. However, if any is remain in the virtual device row of the (M+1)×N selection matrix, then the service design engine 150 should continue comparing capabilities of candidate devices to the required capabilities. If no candidate devices remain, then the service design engine 150 can exit the process. The set of candidate devices cannot provide the desired service (i.e., the problem has no solution).

In one or more embodiments, previously-constructed virtual devices can be include in set of candidate devices that are processed via the Device-Capability matrix. That is, once a virtual device is constructed by the service design engine 150 (or imported into the combinatorial server 130 as a "known solution set)," then this solution set of devices can be used to seed the Device-Capability matrix with a solution to the desired service. In another embodiment, the virtual device can be synthesized from other virtual devices. So, for example, if a desired service, S, can be broken down into two sub-services, $S_1$ and $S_2$, such that $S=S_1+S_2$. If $S_1$ and $S_2$ are, themselves, known virtual devices that can be constructed from known and non-overlapping solution sets, then the service design engine 150 can conclude that the desired service S can simply be synthesized by synthesizing $S_1$ and $S_2$ and then connecting these virtual devices as required to produce S. Re-selecting candidate devices can be used as a strategy for optimizing ongoing combinatorial services. However, in one or more embodiments, to enable multiple concurrent combinatorial services while avoiding duplicate commitments, the list of solutions sets and device capabilities selected and assigned to current virtual devices can be maintained across several service designs.

Candidate Device Selection Policies

In one or more embodiments, the selection of the solutions set of devices from the set of candidate devices can be performed in a number of other ways. In one embodiment, appealing combinations of solutions sets of devices can be determined, and, then, the user can be presented with a price or cost for using this solution set of devices to achieve the service. Alternatively, the user can presented with the price or cost for using a particular device or a particular network service in the solution set. The user can then choose from the available solution set options as one might choose among a set of airline flight itineraries. In one or more embodiments, the service design engine 130 can produce solution sets with "appealing" combinations by using one or more selection policies.

In one or more embodiments, the service design engine 150 can compare each candidate device j with the target virtual device (row M+1). The service design engine 150 can then choose the candidate device x with the lowest distance d(x,y) to the virtual device y. The service design engine 150 can then update the virtual device row (removing the capabilities provided by x) and try again. This selection policy can yield a smallest possible selection (lowest number of components) for the solution set of devices. In this case, the rows (candidate devices) in the Device-Capabilities matrix are vectors with components that are either 0 (the device does not have the capability) or 1 (it does). The distance d(x,y) can be defined between vectors x and y as a count of all the columns in which they differ. For example, If x=(0,1,1,0,1,1) and y=(0,0,1,1,1), then d(x,y)=2.

In one or more embodiments, the service design engine 150 can sort candidate devices x1, . . . xM according to their frequency of use, and can first use in the solution set those that are less frequently engaged by the customer. This policy can minimizes inconvenience to the end user for the resulting solution set of devices by minimizing occurrences, where the user temporarily loses control over the devices in the solution set.

In one or more embodiments, the service design engine 150 can associate device-specific costs with each candidate device that is chosen. The service design engine 150 can then assign the candidate devices to required functions of the virtual device, where the low-cost devices are assigned first and the higher-cost devices are assigned later. This selection policy can result in lower cost solution sets of devices.

In one or more embodiments, the service design engine 150 can attempt to maximize the list of capabilities remaining in the matrix after the final device in the solution set of devices has been chosen (e.g., choose device x with lowest number of 1's in its row, thus maximizing the potential for further services from the remaining candidate device). This selection policy can maximize spare capabilities for additional services.

In one or more embodiments, the service design engine 150 can seek to minimize the data rate of streams and/or data transfer volumes necessary for the capabilities that are selected from the candidate devices and/or for the aggregate service that is synthesized by the service design engine 150. This selection policy can minimize movement of data.

In one or more embodiments, the service design engine 150 can select devices for the solution set of devices so as to include devices near a desired location or dedicated to a desired purpose.

In one or more embodiments, the service design engine 150 can weight selections of the devices for the solution set of devices according to a weighting policy. For example, certain combinations of devices can be weighted higher or lower depending upon how desirable the combination is or is not. I Assigning Devices to Roles In one or more embodiments, if more than one device in the solution set of devices includes a capability that lines up with a required capability of the virtual device, then the service design engine 150 can decide which components will contribute which capabilities to the virtual device. Once a candidate device has been chosen for inclusion in the solution set of devices, then the candidate device becomes a component of the virtual device. However, if more than one component device can provide the same required capabilities, then the service design engine 150 will need to choose between these options in a processes called assignment. For example, a solution set for a virtual device may include three components that are capable of sound—an expensive and very powerful stationary stereo system in the user's living room, a smartphone which can provide sound via stereo earplugs, and an HDMI TV set, capable of (admittedly limited) stereo sound. The service design engine 150 can make this assignment choice based on an assignment policy. The assignment policy can include criteria for making the decision. For example, the decision can be driven by functional factors, such as sound accuracy or power (e.g., for a classical music listening service), weight (portability), privacy, location, and so forth. Where the service design engine 150 faces an assignment choice, it may also allow the user to decide. For example, the service design engine 150 can recommend an assignment based on the assignment policy but allow the user to make the final choice among the components that can provide the capability.

In one or more embodiments, each component may contribute to the virtual device a subset of that component's capabilities as selected and/or assigned by the service design engine 150. The assignment can be considered the role of the component in the solution set of devices for which it has already been selected. Rules for selection:

If each capability in the virtual device is provided by exactly one component (e.g., a virtual device requiring four capabilities is constructed by inclusion of four different devices, each fulfilling one role), then the roles are straightforward. Each component is responsible for all those capabilities for which it is the only contributor.

However, if more than one options is present in the solution set of devices for any of the required functions, then the system can apply an assignment policy and/or can interact with the user. The user can be presented with a list of functional differences and can be allow to make choices, or can accept recommended or default choices based on the assignment policy, personal history, cost, etc.

Orchestration

In one or more embodiments, the orchestration server 165 of the combinatorial server 130 can orchestrate the performance of processes across the solution set of devices in the virtual device to set up the service. Orchestration is running processes capable of assembling the virtual device, based on the chosen components. After design is complete, a virtual device for performing the combinatorial service can be made from a set of components that have been selected and assigned specific (capability) contributions. This virtual device will have all the necessary capabilities and behavior to provide the service. During orchestration, the orchestration server provides the component devices with the necessary software, configuration and state so that each component can contribute its capabilities to the combinatorial service under control so the virtual device can function properly.

In one or more embodiments, an orchestration library can be included with the combinatorial server 130. The orchestration library can be a database including multiple instances of Capabilities, Combinatorial Services, Orchestration Procedures, Operations, Capability Virtual Machines, and Hypervisors, along with relations between these entities. Capabilities can be susceptible to description but otherwise function as design primitives. Combinatorial Services can be described in terms of a set of capabilities, a virtual device FSM, and an orchestration procedure. Orchestration Procedures can be described by a set of operations that must be performed, a shuttle describing the precedence relations among the operations, and a maximum rank. Operations may be identified as simple (associated to an agent capable of directly executing them) or complex (that can be mapped to another orchestration procedure). Capability Virtual Machines can be associated with capabilities, but must specify both Capability FSMs and Capability Implementation modules. Hypervisors can be type 2 (or hosted hypervisors), but must specify hardware/software required and a list of the capabilities supported.

Control of Components Operating in Virtual Device

Figure 2:
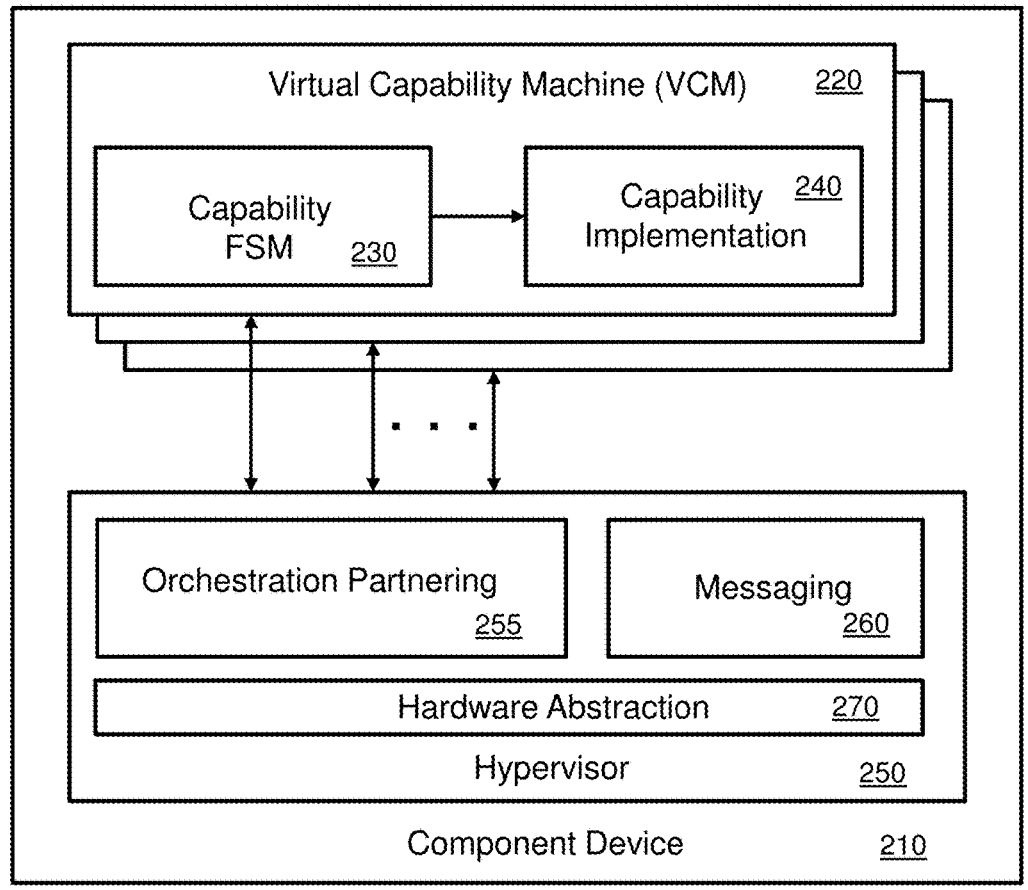
FIG. 2 depicts illustrative embodiments of control functional blocks that can be used at component devices selected for inclusion in a combinatorial service for orchestrating a virtual device.

FIG. 2 depicts illustrative embodiments of control functional blocks that can be used at component devices selected for inclusion in a combinatorial service implemented (or represented) by a virtual device. In one or more embodiments, each component 200 of the combinatorial device can execute software in the form of a Virtual Capability Machines (VCM) 220. The VCM 220 can access the capabilities of the component that it is contributing. In one embodiment, a type 2 hypervisor 250 can run atop an operating system (OS) at the component. The hypervisor 250 can handle functions common to each of the VCMs 220 operating at each of the selected components. In one embodiment, the hypervisor 250 can handle functions for hardware abstraction 270, orchestration engine partnering 255, and messaging 260 with other capability finite state machines (FSMs) 230, where each FSM can act as a model of computation. In one embodiment, the component device 200 can be a virtual device that, itself, is built from physical component devices.

In one or more embodiments, the capability FSM 230 can receive signals that trigger state changes to control the capability of the component. The capability FSM 230 can be controlled by messages that the component receives from a virtual device FSM hosted in the controlling device. In one embodiment, the hardware abstraction module 270 can be the only function that is component-specific. In one embodiment, the VCM 220 can run on top of the hypervisor 250. In one embodiment, the capability implementation module 240 can respond to changes of state of the Capability FSM 230 in the VCM 220.

Control of Virtual Device Operation

Figure 3:
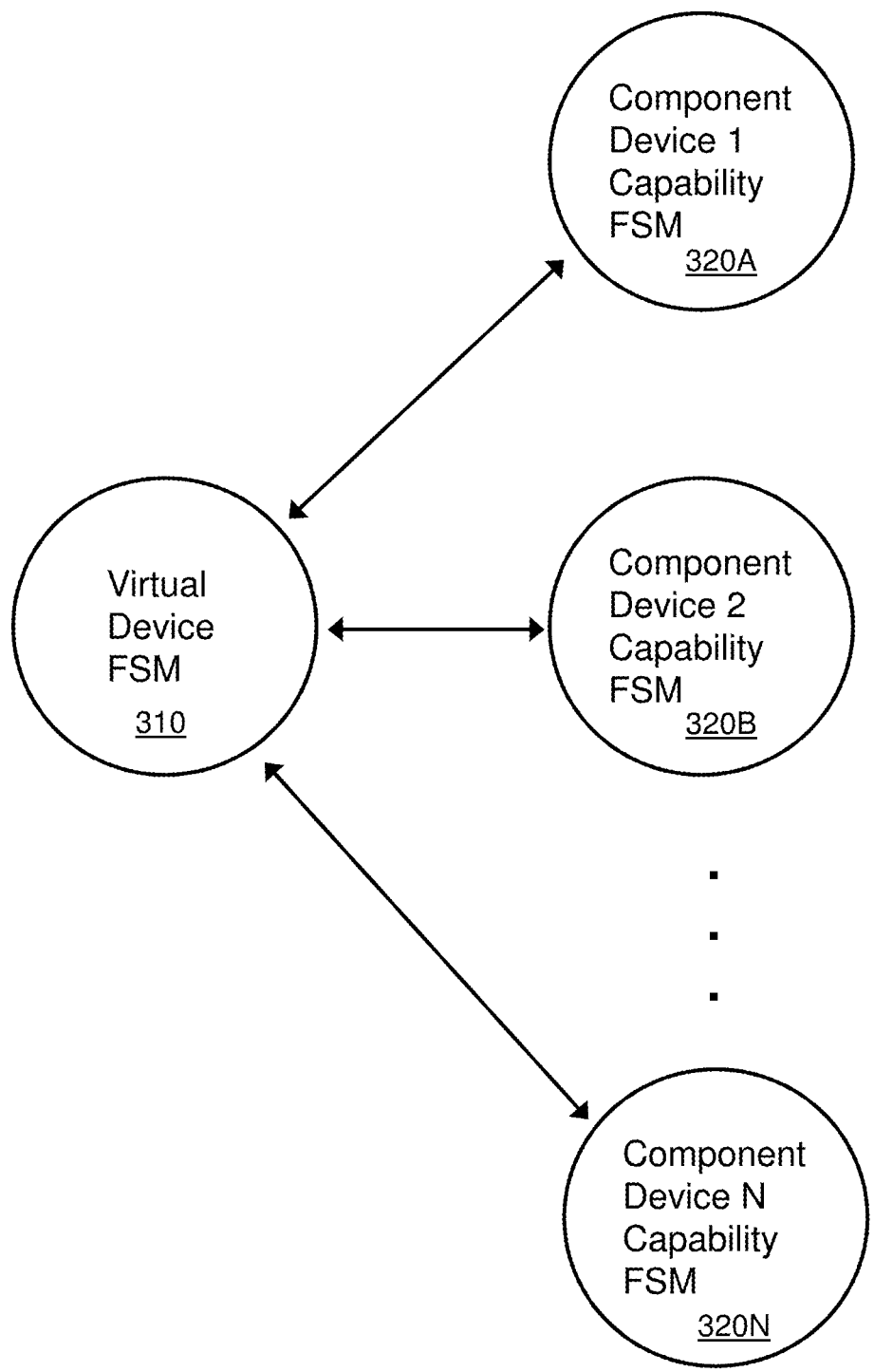
FIG. 3 depicts illustrative embodiments of usage of finite state machines (FSMs) and inter FSM messaging co-operate to implement the combinatorial service.

FIG. 3 depicts illustrative embodiments of usage of finite state machines (FSMs) and inter FSM messaging that can be used at the virtual device and component devices to control the operation of the combinatorial service. In one or more embodiments, the virtual device can include a controlling device. The controlling device is a component that implements a Capability Virtual Machine (CVM) that describes the virtual device behavior as a whole. In one embodiment, there can only be one active controlling device at each point in time, but there may be more than one active controlling device during the life of a combinatorial service. In one or more embodiments, the virtual device 300 can be operational (ready to begin performing its service) when a CVM that describes the operation of the virtual device is active in a controlling device. The FSM of this CVM (the CVM of the controlling device) can be called the Virtual Device FSM 310. The Virtual Device CVM 310 can present the user with a control interface (e.g., screen interface, voice interface, brain-computer interface, etc.) consistent with the operation of the Virtual Device FSM 310. The Capability Implementation module in the controlling device can then send messages to the component device capability FSMs 320A-N. The messages can be sent via the CVMs of the component device capability FSMs 320A-N, wherever they are.

In one or more embodiments, each of the capability FSMs 320A-N can begin the sequence in a known initial state, so that the devices are predictable and controllable. In one embodiment, communication protocols between all of the devices in the solution set of device can provide for reliable message transmissions (e.g., retransmissions, ACKs, etc.) between the devices. Since each capability of each device is controlled via messages from the virtual device FSM 310, the operation of the virtual device can be seen in terms of messaging interactions between the Capability FSM 310 in the controlling device, and the Capability FSMs 320A-N in the component devices.

Release of Components from Virtual Device

In one or more embodiments, when the combinatorial service is completed, then the virtual device can be dismissed. At this point, the component devices of the solution set of devices can be released from their roles and returned to normal operation. For practical reasons, the release process can be carried out in several steps. First, the end user can dismiss (via the controlling device) the virtual device. This dismissal can cause the virtual device to send a signal to external systems that trigger other actions. During the release process, the orchestration process used when instantiating the Virtual Device is "reversed." The reversal of the orchestration procedure can cause performance of operations in a sequence-reversed order to undo what was done in the startup sequence for the virtual device. For example, the reversed operations can disconnect streams, can shut down CVMs in the component devices, and can remove component storage no longer needed for software or configuration. The "reversed" process can, itself, be in the form of an orchestration but with a different goal.

Orchestration a Virtual Device

FIGS. 4A-4D depict illustrative embodiments of how the orchestration process inserts FSMs and other functional blocks used by the virtual device to control the combinatorial services via the selected communication devices. This section discusses orchestration of a combinatorial service: there is a set of component devices, each of which can contribute some (software defined) capabilities to provide a service. This service can be represented by a "virtual device" that has the necessary attributes and behavior (described by a Finite State Machine) and that can be controlled from one of the components, known as the "control device." The virtual device can be operational when:

A CVM describing the operation of the virtual device is implemented in the controlling device, where FSM is the "Virtual Device FSM;"

The CVM presents the user with a control interface (e.g., screen, voice, BCI, etc.) consistent with operation of the Virtual Device FSM;

The Capability Implementation module in the controlling device sends messages to other Capability FSMs (via their CVMs);

Each of the Capability FSMs starts out in a known initial state, so that the devices are controllable; and Communication between all devices supports reliable message transmissions.

Orchestration Planning

In one or more embodiments, before orchestration can begin, an orchestration plan is needed. The orchestration plan can be created by the combinatorial server by determining the characteristics and capabilities of the virtual device to be assembled (e.g., its FSM and associated capabilities), a list of component devices and their IP addresses, and a list of which capabilities each component device contributes to the virtual device aggregation. The aggregation can be viewed as a set of capabilities attached to the solution set of devices as:

(capability1, device1 make/model, IP address of device1);
(capability2, device1 make/model, IP address of device2);
. . .
(capabilityN, deviceN make/model, IP address of deviceN).

Figure 4A:
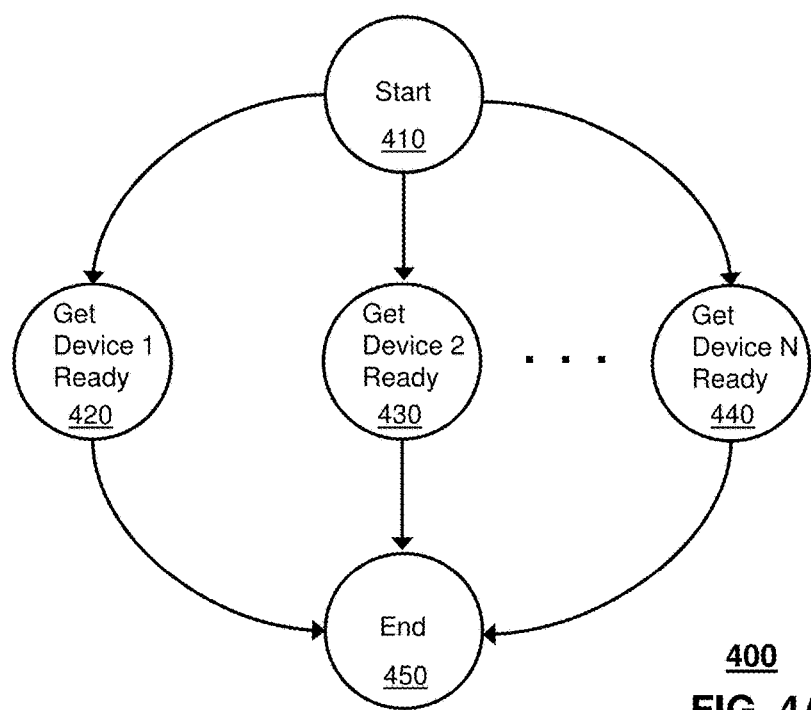
FIGS. 4A-4D depict illustrative embodiments of how the orchestration process inserts FSMs and functional blocks used by the virtual device to provide the combinatorial services via the selected communication devices.

Referring now to FIG. 4A, in one embodiment, two capabilities can have the same physical device and IP address where the same component contributes more than one capability to the combined service. An orchestration diagram 400 can describe in graphical form, how the virtual device can be made "ready to run". In this diagram 400, each branch between the Start 410 and the End 450 corresponds to, or "touches," one component. In one embodiment, each triplet of the orchestration plan describes what needs to happen with each of the corresponding components to initiate the component and, in turn, initiate the virtual device.

Start of Orchestration

Figure 4B:
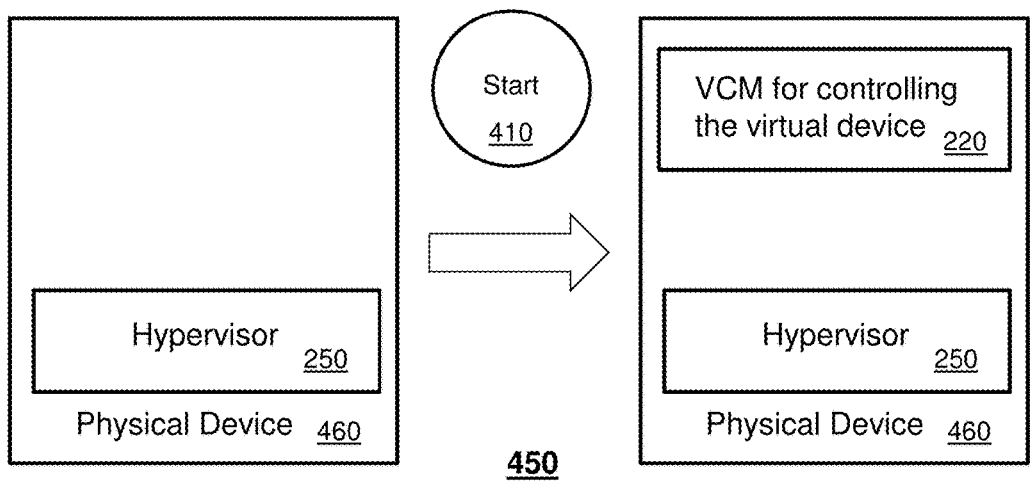

Referring now to FIG. 4B, before modifying the behavior of other component devices, one controlling device 460 for the virtual device must be readied. The operation can be labeled "Start" 410. The Start state 410 can be responsible for preparing the controlling device 460. In one or more embodiments, the controlling device 460 can be prepared by:

backing up the controlling device 460 status to a session manager (cloud), downloading the virtual device VCM 220 (including the virtual device FSM) to the controlling device 460, starting a control interface appropriate to the state machine of the virtual device, and signaling (using the control interface) the end user the device is being orchestrated.

Per Component Orchestration

Figure 4C:
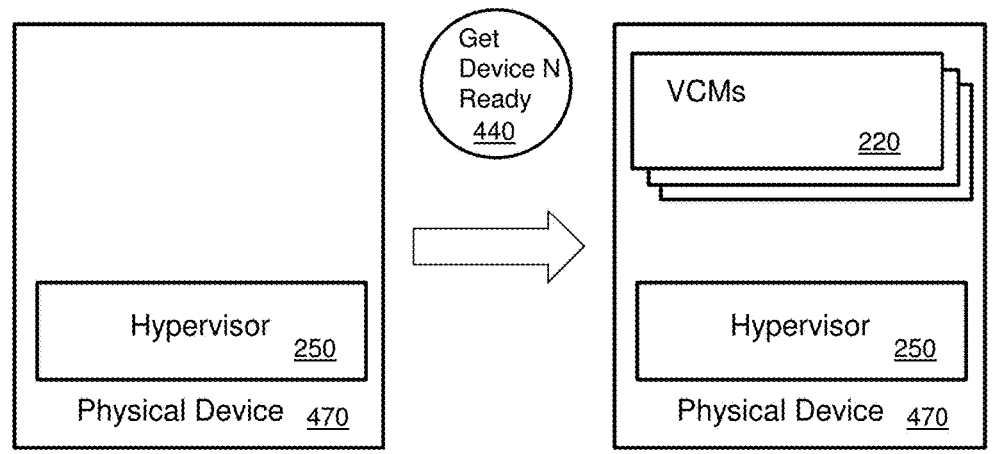
Figure 4D:
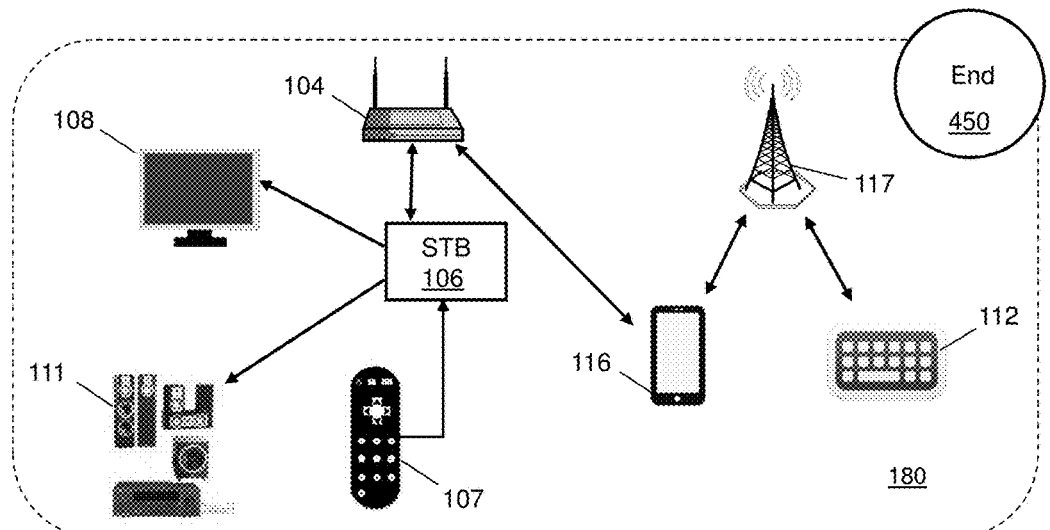

Referring now to FIG. 4C, each of the other component devices 470 can receive software and configuration data it needs to implement the its set of capabilities, and to behave (executing the corresponding Capability FSMs) as expected for as long as it is part of the virtual device. In one or more embodiments, the orchestration for the non-controlling component devices 470 can include:

saving a current state of the component device 470 (to restore after the virtual service is complete), downloading and installing VCM software 220 and configuration data in the component device 470, for each capability assigned to that device (role), starting the VCMs 229 in the component device 470, signaling to the orchestration engine that the component device 470 is ready, and reporting metadata (stream endpoints, formats, etc.,).

End of Orchestration

In one or more embodiments, once each component device 460 and 470 is ready to contribute to the combinatorial service, the virtual device can be started. At the End operation 450, the virtual device can be started by (1) implementing global behavior means, (2) receiving at the orchestration engine the metadata reported by the component devices, (3) setting up data transfers and status while connecting data stream endpoints in various devices, and signaling to the end user that the virtual device is ready. See FIG. 4D as an example.

Orchestration and Graphs

FIGS. 5A-5F depict illustrative embodiments of Directed Acyclic Graphs (DAGs), or shuttles, that can be used to implement the FSMs at the virtual device or the selected communication devices for orchestrations of the combinatorial services via the selected communication devices. Shuttles may be used by the orchestration engine to handle reversals, optimization, and recursion. An operation can be a set of steps executed by a server, a component device, or some other node in a distributed system. If the execution of operation A must complete before starting the execution of operation B, then a directed arc can be drawn starting at operation A (which is a predecessor of operation B), with an arrow pointing at operation B (which is a successor of operation A). Orchestration may require multiple operations ordered by relations of precedence, but having no repetitions. This requirement can lead to two important consequences:

The process can be described by graphs where nodes represent the steps that must be taken and edges that indicate the necessary precedence between the steps. These are called directed graphs.

An orchestration's graph may contains no loops, which can make execution deterministic (i.e., it ends after completing at most N steps) as opposed to a general program. Directed graphs with no loops are called Directed Acyclic Graphs or DAGs.

Special DAGs: Shuttles

Figure 5A:
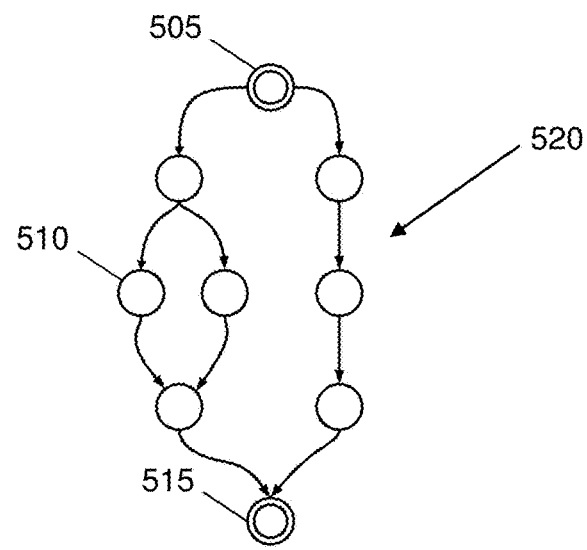
FIGS. 5A-5F depict illustrative embodiments of Directed Acyclic Graphs (DAGs), or shuttles, that can be used to implement orchestrations of combinatorial services.

Referring now to FIG. 5A, in one or more embodiments, an operation can be a set of steps executed by a server, a component device, or some other node in the distributed system. In the Directed Acyclic Graph 520, the operations start at one starting operation 505 (that precedes all others), proceeds through a more or less fat middle, and then ends at one ending operation 515 (that is the successor of all others). The DAG graphs 520 can be called "shuttles"—to stress the similarity with the shape of the device used in weaving to carry the weft (sometimes called 'woof'). Any DAG 520 (or collection of DAGs) can be turned into a shuttle.

In one or more embodiment, actual orchestrations can include steps such as:
   downloading/installing software and data in the component devices,
   starting one or more processes in the component devices, associated to the capabilities for which each device will be responsible opening connections between device endpoints,
   setting up data transfers and status in component devices.
   starting the flow of data streams between components, and
   implementing a control interface for the virtual device.

Orchestration operations can be reversible (i.e., for each operation X, another operation X' called inverse exists, achieving an opposite effect). Orchestration operations can expand the set of orchestration operations to include a "no-op" (clearly reversible). Shuttles can describe the kind of orchestration activities that must take place to set up virtual devices.

Edge Reversal

Figure 5B:
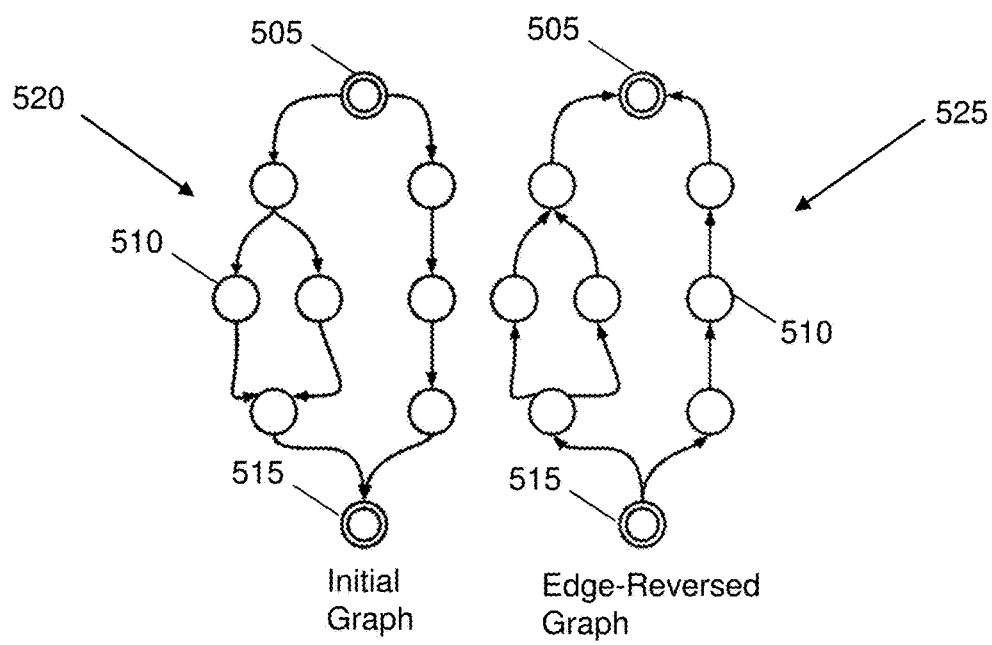

Referring to FIG. 5B, if the direction of an edge between two nodes indicates the order that corresponding operations must be done, then it can be of interest to examine what happens when the direction is reversed. Starting with a DAG 520 and reversing every edge produces yet another DAG 525. In the case of a shuttle 520, the resulting graph is also a shuttle 525, with the start and end nodes interchanged. If the original shuttle 520 represented an orchestration, in the edge-reversed graph each operation can be replaced by its inverse. Edge-reversed orchestrations describe well the orchestration needed to release the virtual device and undo all that was done before. Reversibility provides yet another reason why these are called shuttles—they operate (describe orchestrations) in either direction.

Parallel/Serial Execution of Shuttles

Figure 5C:
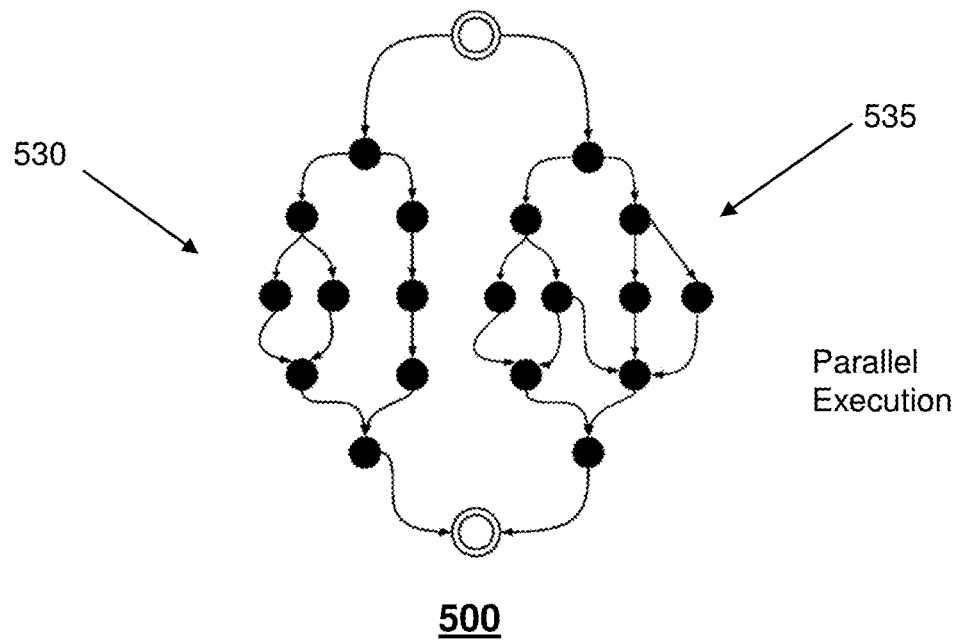
Figure 5D:
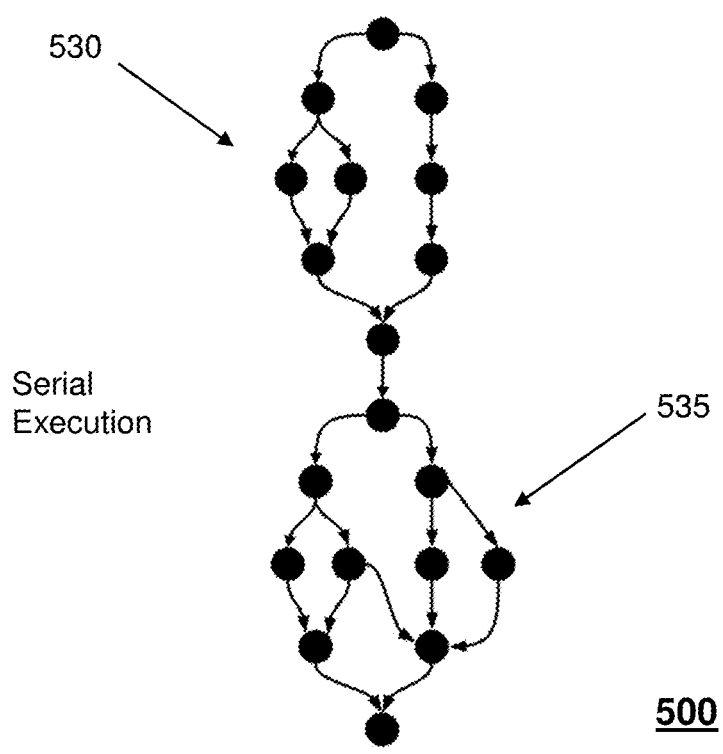

Referring now to FIGS. 5C and 5D, under some circumstances, a design may have to choose between higher speed and more resources in use, or lower speed and less resources. Two shuttles 530 and 535 may be combined in parallel as in FIG. 5C. The directed acyclic graph that results is also a shuttle. If nodes represent operations, the parallel graph can be executed in a total time equal to the maximum of the execution of either of the parallel shuttles 530 and 535. If resources for the two shuttles 530 and 535 come from a common repository, then the parallel execution in the combined shuttle may cause demand for resources to become the sum of resources required by each of the shuttles. In FIG. 5D, the combination of two shuttles 530 and 535 in such a way that all actions associated to one shuttle precede all actions associated with the other shuttle, produces an execution graph that is also a shuttle. Serial execution never demands resources greater than the maximum of those required by one of the shuttles. Execution time, though, is the sum of the times it takes to execute each of the shuttles.

Node Substitution in a Shuttle

Figure 5E:
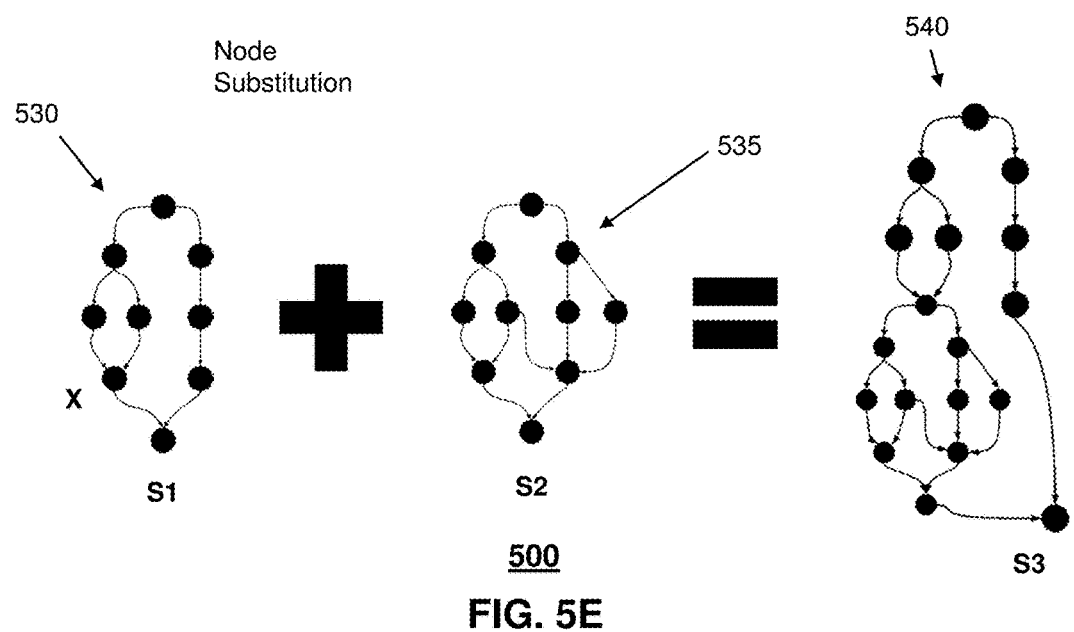

Referring now to FIG. 5E, two shuttles 530 and 535 can be combined to generate a new shuttle 540 that performs the combined functions but either neither a mere serial combination nor a mere parallel combination. In one embodiment, the combined shuttle 540 consists of replacing a single node X in a shuttle S1 530 with a whole other shuttle S2 535, according to the following rules: (1) create a shuttle S3 540, whose vertices are a union of those for shuttles S1 530 (except X) and S2 535, with edges in S1 U S2, except for those edges that have X at one of their endpoints; (2) for each edge (A, X) with A in S1 530, add an edge (A, I2) in S3 540, where I2 is the initial node for S2; and (3) for each edge (X, B) with B in S1 530, add an edge (E2, B) in S3 540, where E2 is the end node for S2 535. The resulting graph is a shuttle 540, in which all precedence relations previously present in S1, S2 have been preserved.

Execution of Shuttles: Rank

Figure 5F:
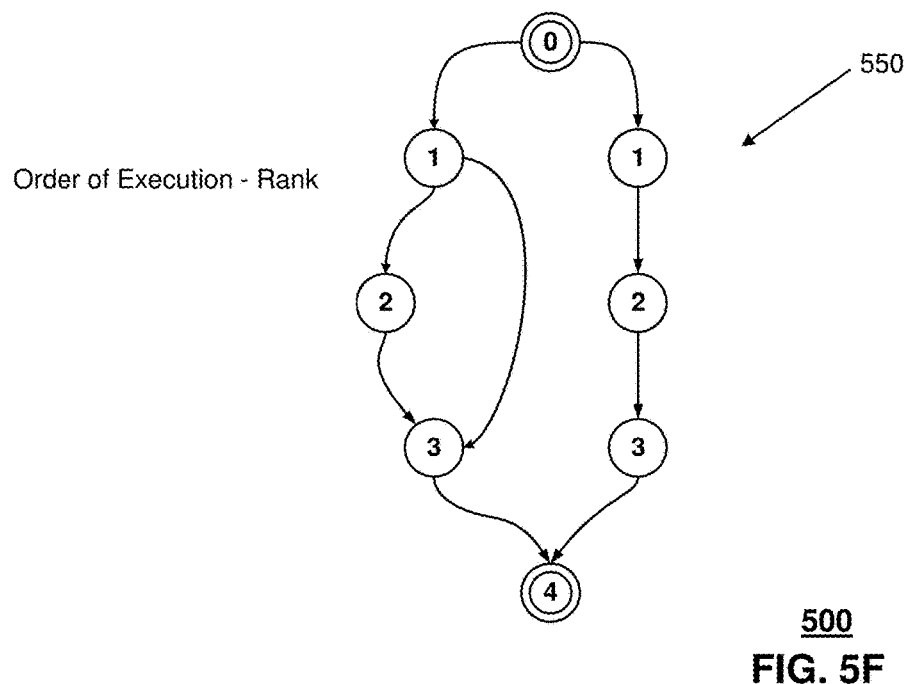

Referring now to FIG. 5F, nodes in a shuttle can be labeled by the "longest distance" (in number of edges traversed) along some path from the initial node, to the current one. This value is the rank of the node. Any order of execution in which all operations with a given rank are carried out before any operation with a higher rank is attempted, is consistent with the constraints represented by the edges in the original shuttle. In other words, for execution purposes, it is sufficient to associate an integer value (the rank) to the nodes and execute nodes according to this value, rather than checking the edges every time. This allows for creating a scheduler that allows for optimal parallelization of a shuttle, with minimal runtime complexity.

Orchestration Operation

In one or more embodiments, the orchestration server 165 can perform a number of functions in orchestrating the service, including:
   1. Receive a request from the service design engine indicating that an orchestration of a procedure P should start.
   2. Retrieve a procedure P from an orchestration library (e.g., a database of orchestration procedures).
   3. Instantiate a copy of the orchestration engine at a physical component device to cause execution of operations in procedure P, in the order of their rank (0, 1, 2, . . . ).

4. Within each rank, fire off execution of each operation in parallel, where:
   a. For simple operations (e.g., operations directly executable by some agent), the orchestration server 165 can ask the agent to execute them. If the agent is a specific orchestration partnering module, then the orchestration server can communicate with the corresponding component device to trigger the execution and report status.
   b. React to exceptions (e.g., resetting, informing the service design engine 150 that orchestration failed).
   c. For a complex operation Q, the orchestration server 165 can push the simple procedure P engine into a stack, and then retrieve 2 to retrieve the complex operation Q.
   d. For anti-root (no-op) operations, the orchestration engine 165 can pop the procedure P engine from the stack and then can continue executing the engine at the top of the stack. If the stack is empty, the orchestration server 165 can notify the user (via the controller device) and the session engine 160 that the device is ready to run.

Figure 6:
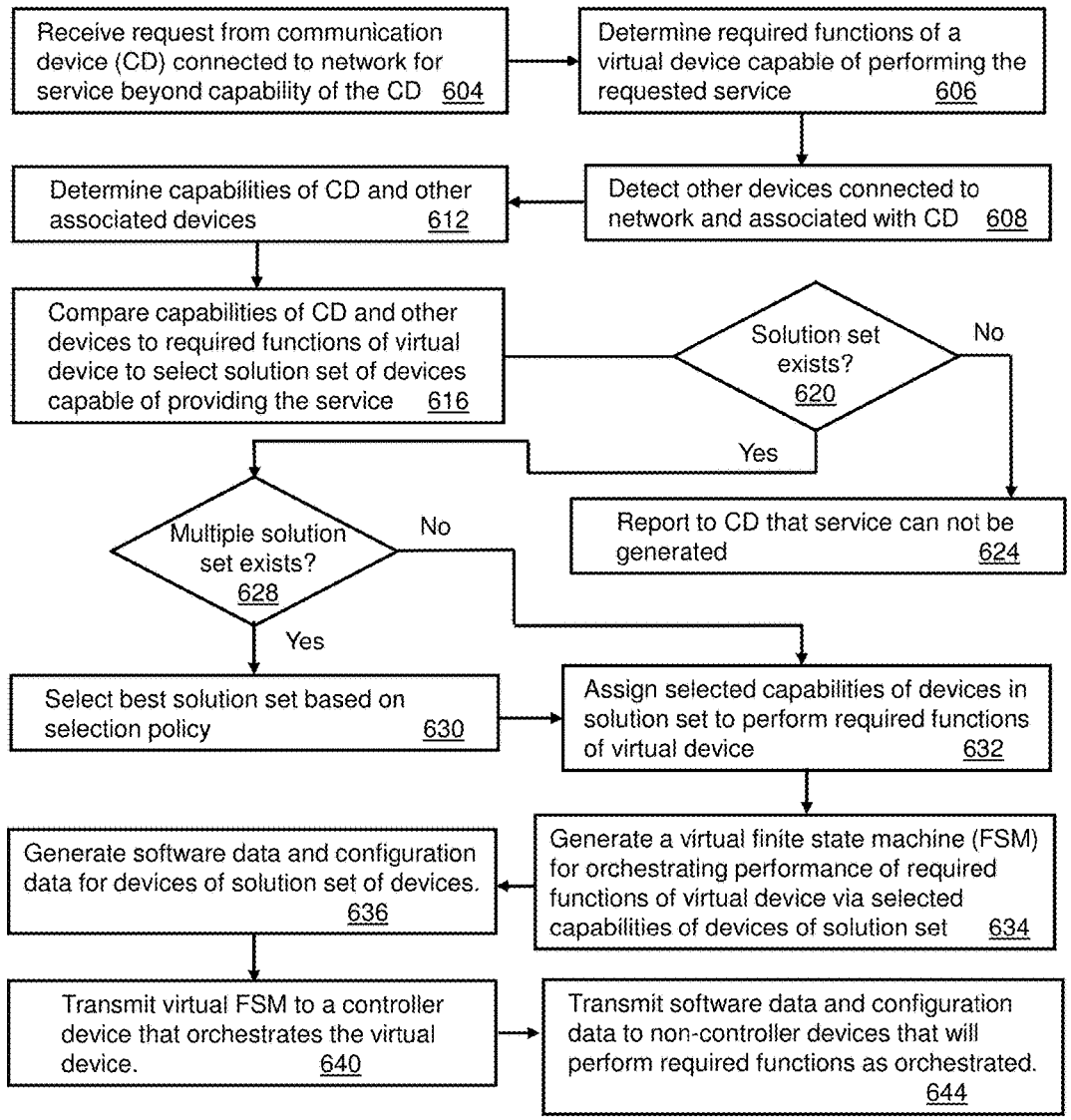
FIG. 6 depicts an illustrative embodiment of a method used in portions of the systems described in FIGS. 1-3, 4A-4D, and 5A-5D.

FIG. 6 depicts an illustrative embodiment of a method used in portions of the systems described in FIGS. 1-3, 4A-4D, and 5A-5D. In step 604, the combinatorial server can receive a request from a communication device (CD) connected to network for service beyond capability of the CD. In step 606, the combinatorial server can determine required functions of a virtual device capable of performing the requested service. In step 608, the combinatorial server can detect other devices connected to network and associated with the CD. In step 612, the combinatorial server can determine capabilities of the CD and other associated devices. In step 616, the combinatorial server can compare capabilities of the CD and other devices to required functions of virtual device to select solution set of devices capable of providing the service.

In step 620, the combinatorial server can determine if a solution set of devices for performing the required functions of the virtual device exists. If it does not exist, then, in step 624, the combinatorial server reports to the CD that the service cannot be generated. If it the solution set does exist, then, in step 628, the combinatorial server determines if there are multiple solution sets. If there are, then, in step 630, the combinatorial server can select a best the solution set based on a selection policy. If there is only one solution set, then, in step 634, the combinatorial server can generate a virtual finite state machine (FSM) for orchestrating performance of required functions of the virtual device via selected capabilities of devices of the solution set. In step 636, the combinatorial server can generate software data and configuration data for devices of the solution set of devices. In steps 640 and 644, the combinatorial server can transmit the virtual FSM to a controller device and the software data and configuration data to non-controller devices of the solution set of devices.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
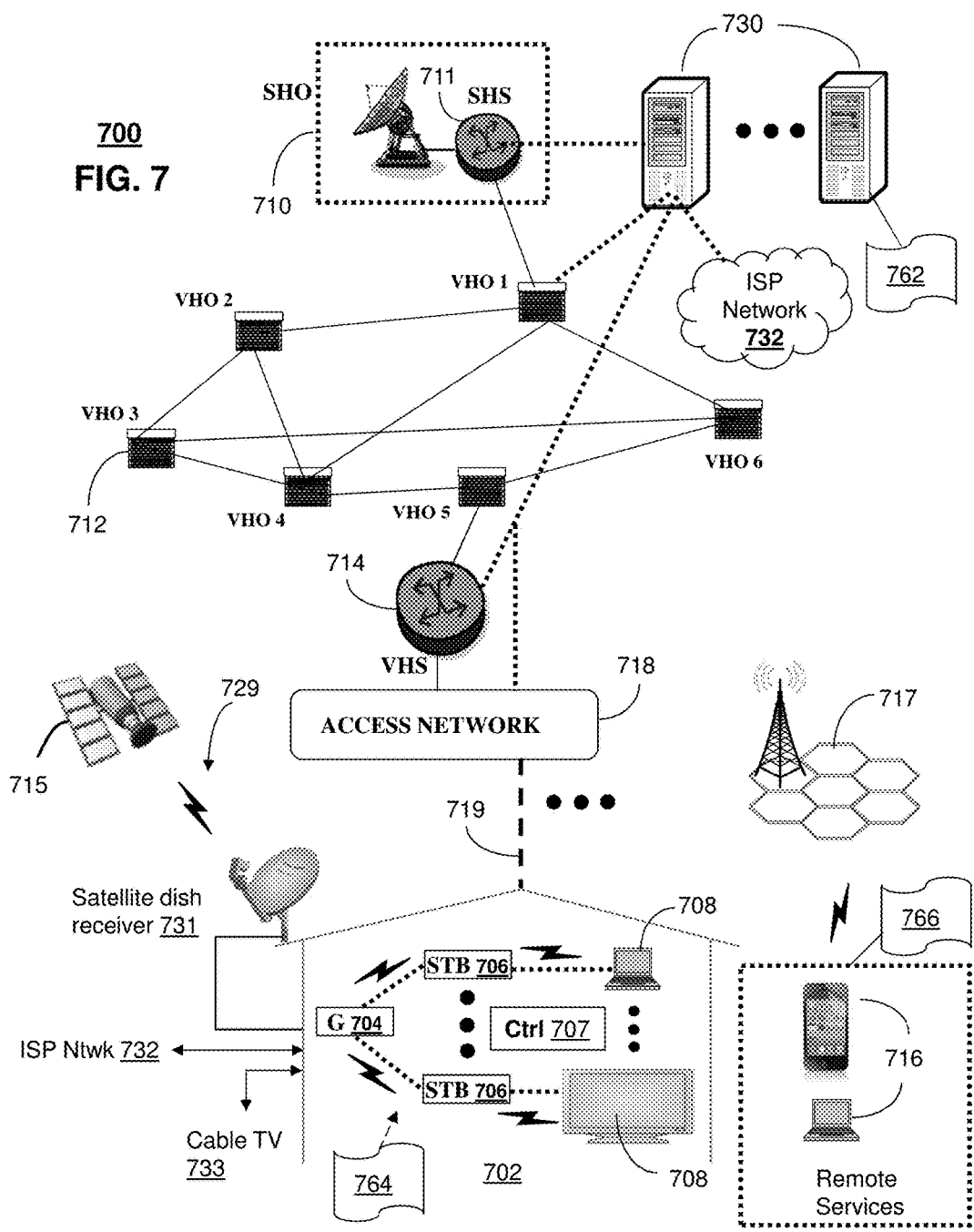
FIGS. 7-8 depict illustrative embodiments of communication systems that provide media services that can be used by the embargoed content system of FIGS. 1-3, 4A-4D, and 5A-5D.

FIG. 7 depicts an illustrative embodiment of a first communication system 700 for delivering media content. The communication system 700 can represent an Internet Protocol Television (IPTV) media system. Communication system 700 can be overlaid or operably coupled with system 100 of FIG. as another representative embodiment of communication system 700. For instance, one or more devices illustrated in the communication system 700 of FIG. 7 for generating a combinatorial service via a virtual device using capabilities of several devices.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a combinatorial server 730. The combinatorial server 730 can use computing and communication technology to perform function 762, which can include among other things, <the method for generating a combinatorial service using a virtual device made up of several devices as described by method 600 of FIG. 6. For instance, function 762 of server 730 can be similar to the functions described for the combinatorial server 130 of FIG. 1 in accordance with method 600. The media processors 706 and wireless communication devices 716 can be provisioned with software functions 764 and 766, respectively, to utilize the services of combinatorial server 730. For instance, functions 764 and 766 of media processors 706 and wireless communication devices 716 can be similar to the functions described for the communication devices 106 and 116 of FIG. 1 in accordance with method 600 of FIG. 6.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
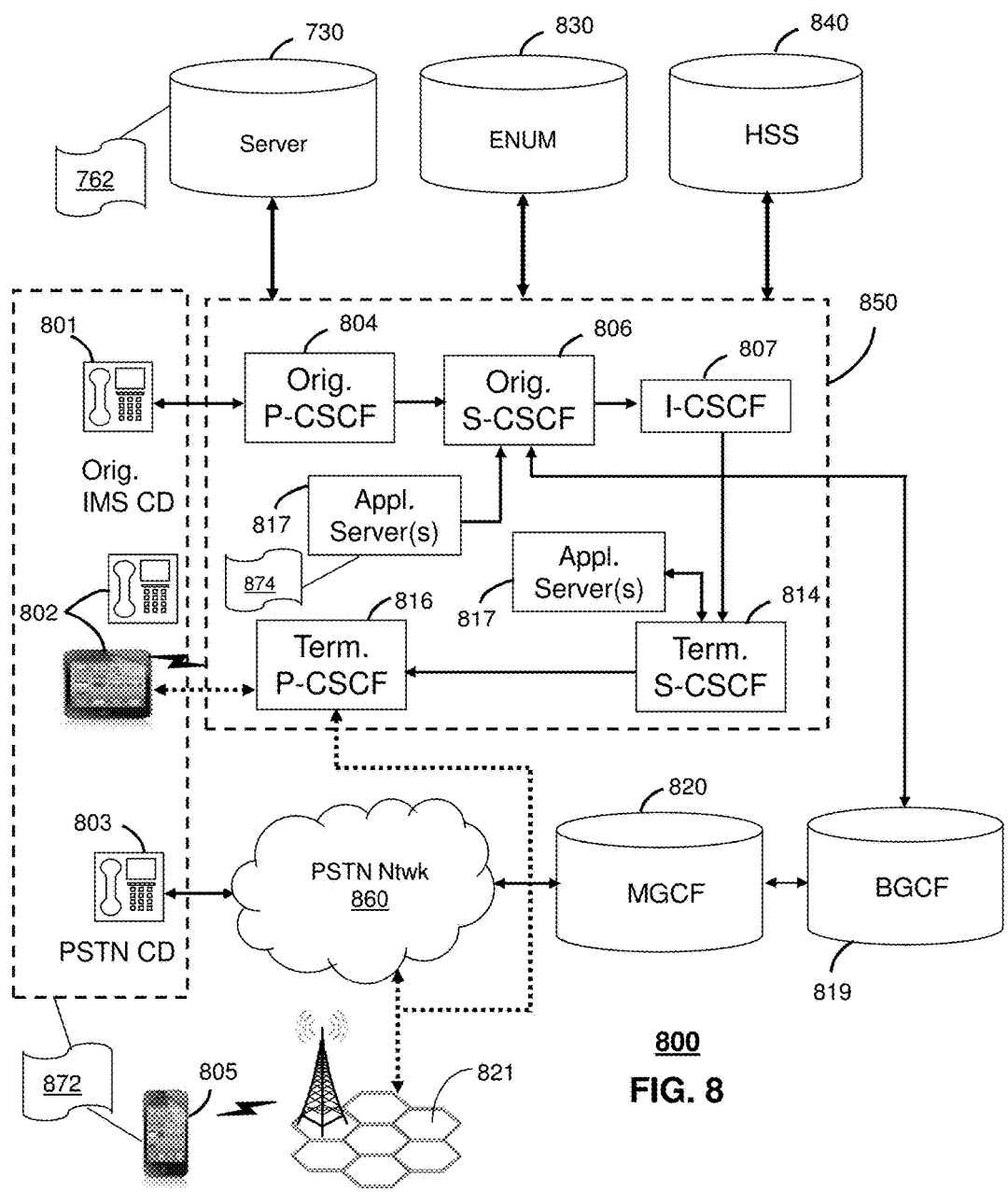

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with system 100 of FIG. 1 and communication system 700 as another representative embodiment of communication system 700 for providing a combinatorial service via a virtual device made up of several devices.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The combinatorial server 730 of FIG. 7 can be operably coupled to communication system 800 for purposes similar to those described above. Combinatorial server 730 can perform function 762 and thereby provide combinatorial services to the CDs 801, 802, 803 and 805 of FIG. 8 similar to the functions described for server 130 of FIG. 1 in accordance with method 600 of FIG. 6. CDs 801, 802, 803 and 805, which can be adapted with software to perform function 872 to utilize the services of the combinatorial server 730 similar to the functions described for communication devices 106 and 116 of FIG. 1 in accordance with method 600 of FIG. 6. The combinatorial server 730 can be an integral part of the application server(s) 817 performing function 874, which can be substantially similar to function 764 and adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
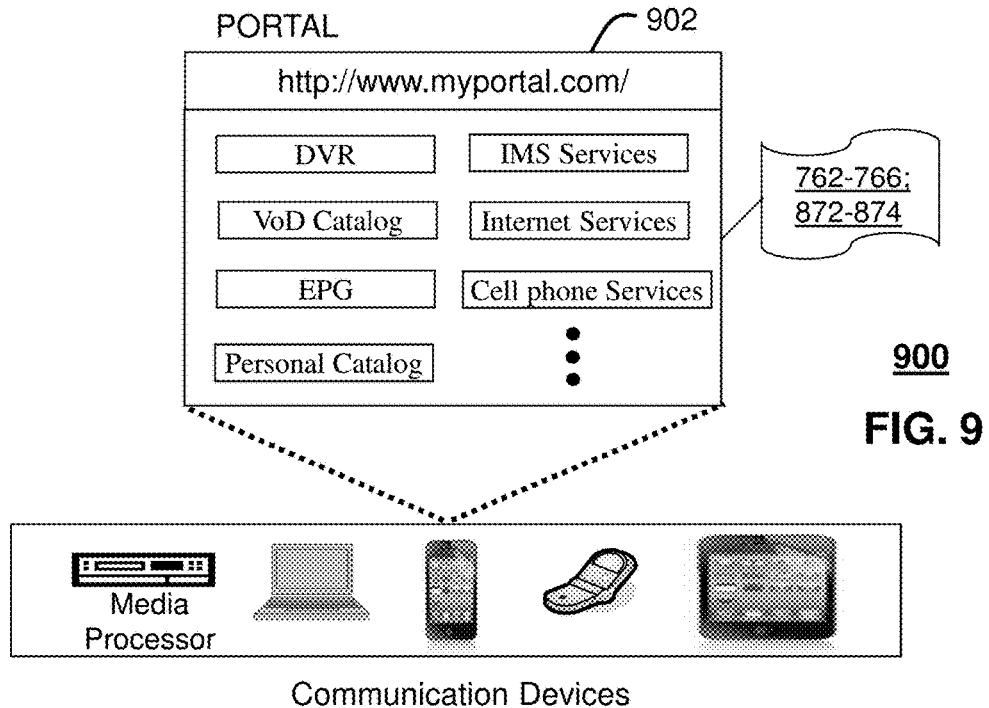
FIG. 9 depicts an illustrative embodiment of a web portal for interacting with the communication systems of FIGS. 1-3, 4A-4D, 5A-5D, and 7-8.

FIG. 9 depicts an illustrative embodiment of a web portal 902 of a communication system 900. Communication system 900 can be overlaid or operably coupled with system 100 of FIG. 1, communication system 700, and/or communication system 800 as another representative embodiment of system 100 of FIG. 1, communication system 700, and/or communication system 800. The web portal 902 can be used for managing services of system 100 of FIG. 1 and communication systems 700-800. A web page of the web portal 902 can be accessed by a Uniform Resource Locator (URL) with an Internet browser using an Internet-capable communication device such as those described in FIG. 1 and FIGS. 7-8. The web portal 902 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 902 can also be used for provisioning IMS services described earlier, provisioning Internet services, provisioning cellular phone services, and so on.

The web portal 902 can further be utilized to manage and provision software applications 762-766, and 872-874 to adapt these applications as may be desired by subscribers and/or service providers of system 100 of FIG. 1, and communication systems 700-800. For instance, users of the services provided by server 130 or server 730 can log into their on-line accounts and provision the servers 130 or server 730 with user profiles, provide contact information to server to enable it to communication with devices described in FIGS. 1-5E, and so on. Service providers can log onto an administrator account to provision, monitor and/or maintain the systems 100 of FIG. 1 or server 730.

Figure 10:
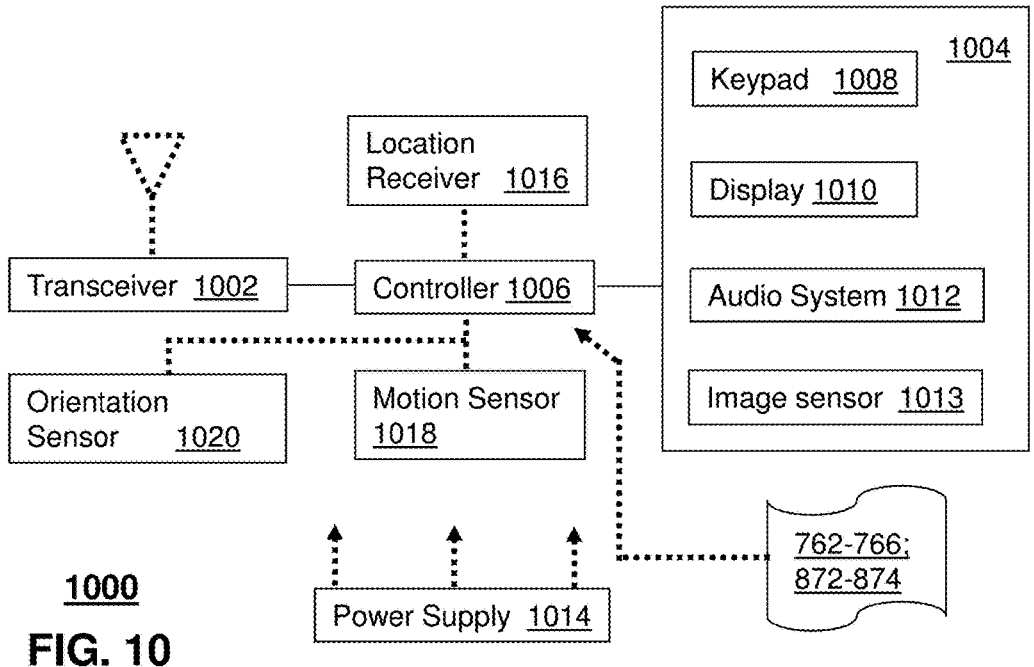
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIG. 1, and FIGS. 4A-5F and can be configured to perform portions of method 100 of FIG. 1.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of the media processor 106, the media devices 108, or the portable communication devices 116 of FIG. 1, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can operate in systems of FIG. 1, communication systems 700-800 of FIGS. 7-8 such as a gaming console and a media player. In addition, the controller 1006 can be adapted in various embodiments to perform the functions 762-766 and 872-874, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
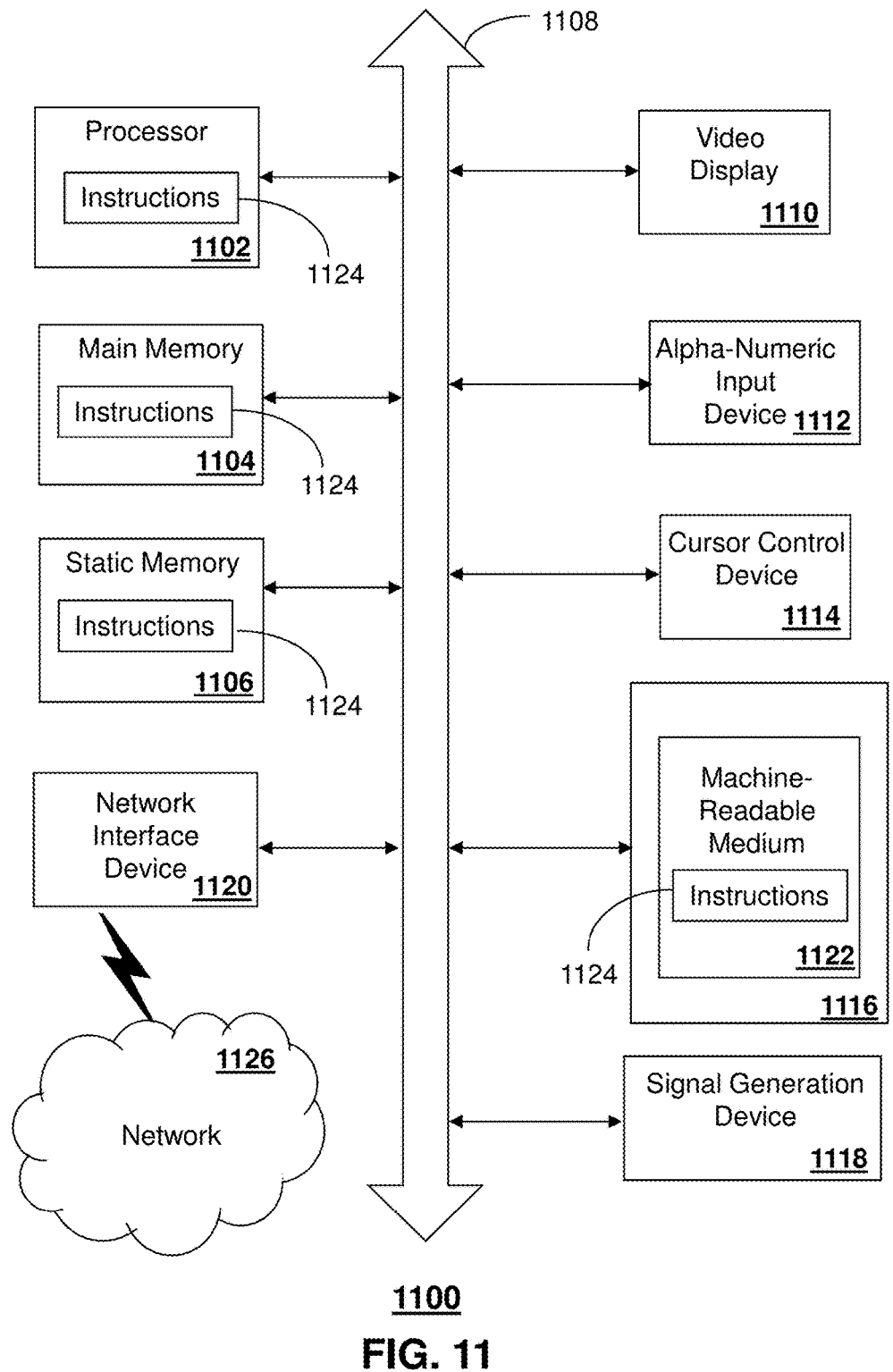
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the combinatorial server 130, the media processor 106, and the mobile communication device 116 and other devices of FIG. 1. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage medium, comprising executable instructions that, when executed by a processing system including a processor, facilitate performance of operations, comprising:

detecting a plurality of devices connected to a network to identify a set of candidate devices;

determining capabilities of each device of the set of candidate devices connected to the network;

selecting a solution set of devices from the set of candidate devices to provide a service to a communication device via a virtual device by comparing the capabilities of each device of the set of candidate devices with a set of required functions of the virtual device capable to provide the service, wherein the communication device is connected to the network;

assigning selected capabilities of each device in the solution set of devices to perform the required functions of the virtual device;

generating a virtual finite state machine for controlling the required functions of the virtual device via the selected capabilities of each device of the solution set of devices, wherein the virtual finite state machine coordinates collaborative efforts of each device of the solution set of devices to generate the service;

generating software data and configuration data for the solution set of devices to allow the virtual finite state machine to control execution of the required functions by the solution set of devices;

transmitting, to a controller device of the solution set of devices, the virtual finite state machine, wherein execution of the virtual finite state machine by the controller device causes the controller device to control the performance of the required functions of the virtual device via the selected capabilities of each device of the solution set of devices; and transmitting, to non-controller devices of the solution set of devices, the software data and the configuration data, wherein execution of the software data at the non-controller devices according to the configuration data causes the non-controller devices to perform the selected capabilities according to signals from the controller device.

2. The machine-readable storage medium of claim 1, wherein the operations further comprise:
  determining whether each device of the set of candidate devices satisfies a constraint characteristic associated with a quality of the service; and
  eliminating a second device of the set of candidate devices prior to selecting the solution set of devices from the set of candidate devices, wherein the second device is determined to fail to satisfy the constraint characteristic associated with the quality of the service.

3. The machine-readable storage medium of claim 2, wherein the capabilities for each device in the set of candidate devices and the set of required functions of the virtual device are compared using a device-capability matrix.

4. The machine-readable storage medium of claim 1, wherein the operations further comprise:
  receiving a request for the service from the communication device; and
  determining that the communication device is not capable of providing the service.

5. The machine-readable storage medium of claim 1, wherein the controller device determines that the service is completed, and wherein the controller device transmits a message to the non-controller devices of the solution set of devices to command the non-controller devices to be released from the virtual device responsive to determining that the service is completed.

6. The machine-readable storage medium of claim 1, wherein the operations further comprise searching the network for the plurality of devices via a search protocol to detect the plurality of devices.

7. The machine-readable storage medium of claim 1, wherein the operations further comprise receiving signals from the plurality of devices to detect the plurality of devices.

8. The machine-readable storage medium of claim 1, wherein the operations further comprise identifying registration of the plurality of devices to the network to detect the plurality of devices.

9. The machine-readable storage medium of claim 1, wherein the solution set of devices is further selected according to a selection policy including criteria applied to the solution set of devices to reduce network distances, minimize device count, minimize service cost, maximize total capabilities, maximize data speeds, target preferred locations, or any combination thereof.

10. The machine-readable storage medium of claim 1, wherein the selected capabilities of each device of the solution set of devices are assigned according to an assignment policy including criteria applied to assignments of the selected capabilities to the required functions of the virtual device to maximize service performance, minimize service cost, enhance user interaction, or any combination thereof.

11. The machine-readable storage medium of claim 1, wherein the operations further comprise generating the software data and the configuration data for the non-controller devices of the solution set of devices to allow the virtual finite state machine to control execution of the required functions by the solution set of devices.

12. The machine-readable storage medium of claim 1, wherein the controller device of the solution set of devices presents a user interface to control the service of the virtual device.

13. A server, comprising:
  a processing system including a processor; and
  a memory that stores executable instructions that, when executed by the processing system, facilitate performance of operations, comprising:
    determining capabilities of each device of a set of candidate devices connected to a network;
    selecting a solution set of devices from the set of candidate devices to provide a service to a communication device via a virtual device by comparing the capabilities of each device of the set of candidate devices with a set of required functions of the virtual device capable to provide the service, wherein the communication device is connected to the network;
    generating a virtual finite state machine for controlling performance of the required functions of the virtual device via selected capabilities of each device of the solution set of devices, wherein the virtual finite state machine coordinates collaborative efforts of each device of the solution set of devices to generate the service;
    generating software data and configuration data for the solution set of devices to allow the virtual finite state machine to control execution of the required functions by the solution set of devices;
    transmitting, to a controller device of the solution set of devices, the virtual finite state machine, wherein execution of the virtual finite state machine by the controller device causes the controller device to control the performance of the required functions of the virtual device via the selected capabilities of each device of the solution set of devices; and
    transmitting, to non-controller devices of the solution set of devices, the software data and the configuration data, wherein execution of the software data at the non-controller devices according to the configuration data causes the non-controller devices to perform the selected capabilities according to signals from the controller device.

14. The server of claim 13, wherein the operations further comprise detecting a plurality of devices connected to the network to identify the set of candidate devices.

15. The server of claim 13, wherein the operations further comprise assigning the selected capabilities of each device in the solution set of devices to perform the required functions of the virtual device, wherein the selected capabilities are assigned according to an assignment policy including criteria applied to assignments of the selected capabilities to the required functions of the virtual device.

16. The server of claim 13, wherein the operations further comprise:
  determining whether each device of the set of candidate devices satisfies a constraint characteristic associated with a quality of the service; and
  eliminating a second device of the set of candidate devices prior to selecting the solution set of devices from the set of candidate devices, wherein the second device is determined to fail to satisfy the constraint characteristic associated with the quality of the service.

17. The server of claim 13, wherein the capabilities for each device in the set of candidate devices and the set of required functions of the virtual device are compared using a device-capability matrix.

18. A method, comprising:
  receiving from a communication device connected to a network, by a processing system comprising a processor, a request for a service;
  determining, by the processing system, that the communication device is not capable of providing the service;

selecting, by the processing system, a solution set of devices from a set of candidate devices connected to the network to provide the service to the communication device via a virtual device, wherein the selecting is based on comparing capabilities of each device of the set of candidate devices with a set of required functions of the virtual device capable to provide the service;

generating, by the processing system, a virtual finite state machine for controlling execution of the required functions of the virtual device via selected capabilities of each device of the solution set of devices, wherein the virtual finite state machine coordinates collaborative efforts of each device of the solution set of devices to generate the service;

generating software data and configuration data for the solution set of devices to allow the virtual finite state machine to control execution of the required functions by the solution set of devices;

transmitting, by the processing system, to a controller device of the solution set of devices, the virtual finite state machine, wherein execution of the virtual finite state machine by the controller device causes the controller device to control the execution of the required functions of the virtual device via the selected capabilities of each device of the solution set of devices; and transmitting, by the processing system, to non-controller devices of the solution set of devices, the software data and the configuration data, wherein execution of the software data at the non-controller devices according to the configuration data causes the non-controller devices to perform the selected capabilities according to signals from the controller device.

19. The method of claim 18, further comprising:

detecting, by the processing system, a plurality of devices connected to the network to identify the set of candidate devices; and determining, by the processing system, capabilities for each device of a set of candidate devices connected to a network.

20. The method of claim 18, further comprising:

determining, by the processing system, whether each device of the set of candidate devices satisfies a constraint characteristic associated with a quality of the service; and eliminating, by the processing system, a second device of the set of candidate devices prior to selecting the solution set of devices from the set of candidate devices, wherein the second device is determined to fail to satisfy the constraint characteristic associated with the quality of the service, and wherein the capabilities for each device in the set of candidate devices and the set of required functions of the virtual device are compared using a device-capability matrix.

* * * * *